United States Patent
Rahman et al.

(10) Patent No.: US 12,403,372 B2
(45) Date of Patent: Sep. 2, 2025

(54) GOLF CLUB FITTING BASED ON MACHINE LEARNING

(71) Applicant: Taylor Made Golf Company, Inc., Carlsbad, CA (US)

(72) Inventors: Brian Rahman, Carlsbad, CA (US); Peter Roberts, Carlsbad, CA (US); Todd Beach, San Diego, CA (US)

(73) Assignee: TAYLOR MADE GOLF COMPANY, INC., Carlsbad, CA (US)

( * ) Notice: Subject to any disclaimer, the term of this patent is extended or adjusted under 35 U.S.C. 154(b) by 137 days.

(21) Appl. No.: 18/401,320

(22) Filed: Dec. 29, 2023

(65) Prior Publication Data

US 2024/0216774 A1    Jul. 4, 2024

Related U.S. Application Data

(60) Provisional application No. 63/436,326, filed on Dec. 30, 2022.

(51) Int. Cl.
*A63B 69/36* (2006.01)
*A63B 71/06* (2006.01)
*G06N 20/00* (2019.01)

(52) U.S. Cl.
CPC ...... *A63B 69/3605* (2020.08); *A63B 71/0622* (2013.01); *G06N 20/00* (2019.01); *A63B 2225/50* (2013.01)

(58) Field of Classification Search
CPC ..... A63B 53/04; A63B 60/00; A63B 69/3605; A63B 71/0622; G06N 20/00
See application file for complete search history.

(56) References Cited

U.S. PATENT DOCUMENTS

| | | | |
|---|---|---|---|
| 8,012,039 B2 | 9/2011 | Greaney et al. | |
| 9,384,671 B2 | 7/2016 | Krosky et al. | |
| 9,697,613 B2 | 7/2017 | Tofolo et al. | |

(Continued)

FOREIGN PATENT DOCUMENTS

WO    20210150127    7/2021

OTHER PUBLICATIONS

Image of Fine Tuned Putter Kiosk video available at https://www.youtube.com/watch?v=aCyZsfEneyY, accessed Mar. 4, 2024.

(Continued)

*Primary Examiner* — Omkar A Deodhar
(74) *Attorney, Agent, or Firm* — Kunzler Bean & Adamson

(57) ABSTRACT

Apparatus for a machine-learning-based golf club fitting platform is disclosed. An apparatus includes a processor and a memory. The memory stores code executable by the processor to receive a first set of golf swing data for a user, the first set of golf swing data representative of one or more characteristics of a golf swing of the user; determine one or more optimal specifications of at least one hypothetical golf club that is a best fit for the user using a property prediction machine learning model based on the first set of golf swing data; and determine at least one pre-existing golf club, comprising predefined specifications, that is a best match for the user based on a comparison of the determined one or more optimal specifications of the at least one hypothetical golf club to the predefined specifications of a plurality of different pre-existing golf clubs.

22 Claims, 9 Drawing Sheets

(56) References Cited

U.S. PATENT DOCUMENTS

| | | | |
|---|---|---|---|
| 9,814,944 | B1 | 11/2017 | Greaney et al. |
| 10,223,797 | B2 | 3/2019 | Tofolo et al. |
| 10,653,926 | B2 | 5/2020 | Story et al. |
| 10,799,759 | B2 * | 10/2020 | Hixenbaugh ............ G06F 18/00 |
| 10,888,746 | B1 | 1/2021 | Greaney et al. |
| 11,219,803 | B2 | 1/2022 | Greaney et al. |
| 11,305,163 | B2 | 4/2022 | Johnson et al. |
| 11,305,165 | B2 | 4/2022 | Dipert et al. |
| 11,318,358 | B1 | 5/2022 | Story et al. |
| 11,850,490 | B1 * | 12/2023 | DeStefano ......... G06Q 30/0282 |
| 2018/0200605 | A1 * | 7/2018 | Syed .................. A63B 69/3605 |
| 2019/0232121 | A1 | 8/2019 | Greaney et al. |
| 2020/0155899 | A1 * | 5/2020 | Hixenbaugh ...... A63B 69/3614 |
| 2020/0298057 | A1 * | 9/2020 | Wycoff .................. G06V 40/23 |
| 2021/0069548 | A1 | 3/2021 | Beach et al. |
| 2021/0331045 | A1 | 10/2021 | Halberg et al. |
| 2022/0118326 | A1 | 4/2022 | Halbert et al. |

OTHER PUBLICATIONS

Image of Titleist Iron Selector available at https://www.titleist.com/golf-clubs/irons-selector?utm_source=google&utm_medium=cpc&utm_campaign=Google_GolfClubs_Brand_Alpha&utm_content=Clubs_Iron_Selector_Tool_Alpha&utm_term=titleist%20iron%20selector%20tool&gad_source=1&gclid=CjwKCAiA_5WvBhBAEiwAZtCU79macp4zRhfbCwfcDnYmXARTiWBSc3DD4Lbrgn_4vetN5RH4XS5TRhoCvt8QAvD_BWE, accessed Mar. 5, 2024.

Image of Titleist Driver Selector Tool available at https://www.titleist.com/golf-clubs/driver-selector?utm_source=google&utm_medium=cpc&utm_campaign=Google_GolfClubs_Brand_Alpha&utm_content=Clubs_Driver_Selector_Tool_Alpha&utm_term=titleist driver selector&gad_source=1&gclid=CjwKCAiA_5WvBhBAEiwAZtCU7ws10hogPOpc4ocDoGgDsCeJDYY_qvH-m2PEezi9B1NRSPYTB604ChoC0qcQAvD_BWE, accessed Mar. 5, 2024.

Image of TaylorMade Irons Selector tool available at https://www.taylormadegolf.com/irons-recommender.html, accessed Mar. 5, 2024.

Image of TaylorMade Driver Recommender available at https://www.taylormadegolf.com/customshop/?lang=en_US&model=TM_DRIVER_MODEL, accessed Mar. 5, 2024.

Image of Titleist Custom Fitting available at https://www.titleist.com/fitting, accessed Mar. 5, 2024.

Image of Titleist Golf Ball Selector available at https://www.titleist.com/golf-ball-fitting-tool, accessed Mar. 5, 2024.

Image of Vokey Design Wedge Selector Tool available at https://www.vokey.com/tools/wedge-selector-tool.aspx, accessed Mar. 5, 2024.

* cited by examiner

GOLF CLUB FITTING BASED ON MACHINE LEARNING

CROSS-REFERENCE TO RELATED APPLICATIONS

This application claims the benefit of U.S. Provisional Patent Application No. 63/436,326, filed on Dec. 30, 2022, which is herein incorporated by reference in its entirety.

FIELD

This invention relates to golf club fitting systems and more particularly relates to a club fitting platform based on machine learning.

BACKGROUND

A golf club fitting may refer to the process of determining which golf clubs (e.g., golf club brand, golf club configuration, golf club characteristics, etc.) best enable a player being fitted to achieve optimal results when practicing or playing golf. More specifically, a golf club fitting can help determine which golf clubs promote better ball striking, shot shaping, distance, and distance control by determining and accounting for the swing dynamics of a golfer being fitted. Generally, golf club fittings can help a golfer being fitted select golf clubs that will optimize the golfer's performance, feel, and consistency when playing or practicing golf.

BRIEF SUMMARY

Apparatuses, methods, program products, and systems are disclosed for a machine-learning-based golf club fitting.

In one embodiment, an apparatus includes a processor and a memory. In one embodiment, the memory stores code executable by the processor to receive a first set of golf swing data for a user, the first set of golf swing data representative of one or more characteristics of a golf swing of the user. In one embodiment, the memory stores code executable by the processor to determine one or more optimal specifications of at least one hypothetical golf club that is a best fit for the user using a property prediction machine learning model based on the first set of golf swing data. In one embodiment, the memory stores code executable by the processor to determine at least one pre-existing golf club, comprising predefined specifications, that is a best match for the user based on a comparison of the determined one or more optimal specifications of the at least one hypothetical golf club to the predefined specifications of a plurality of different pre-existing golf clubs.

In one embodiment, a system includes a kiosk device that includes a touch-enabled display, a processor coupled to the touch-enabled electronic display, and a memory. In one embodiment, the memory stores code executable by the processor to receive a first set of golf swing data for a user, the first set of golf swing data representative of one or more characteristics of a golf swing of the user. In one embodiment, the memory stores code executable by the processor to determine one or more optimal specifications of at least one hypothetical golf club that is a best fit for the user using a property prediction machine learning model based on the first set of golf swing data. In one embodiment, the memory stores code executable by the processor to determine at least one pre-existing golf club, comprising predefined specifications, that is a best match for the user based on a comparison of the determined one or more optimal specifications of the at least one hypothetical golf club to the predefined specifications of a plurality of different pre-existing golf clubs. In one embodiment, the memory stores code executable by the processor to present, on the touch-enabled electronic display, the determined at least one pre-existing golf club.

In one embodiment, a method includes receiving a first set of golf swing data for a user, the first set of golf swing data representative of one or more characteristics of a golf swing of the user. In one embodiment, the method includes determining one or more optimal specifications of at least one hypothetical golf club that is a best fit for the user using a property prediction machine learning model based on the first set of golf swing data. In one embodiment, the method includes determining at least one pre-existing golf club, comprising predefined performance specifications, that is a best match for the user based on a comparison of the determined one or more optimal specifications of the at least one hypothetical golf club for the user to predefined performance specifications of a plurality of different pre-existing golf clubs.

In one embodiment, a computer program product includes a computer readable storage medium that has program code embodied therein. In one embodiment, the program code is readable/executable by a processor for receiving a first set of golf swing data for a user, the first set of golf swing data representative of one or more characteristics of a golf swing of the user. In one embodiment, the program code is readable/executable by a processor for determining one or more optimal specifications of at least one hypothetical golf club that is a best fit for the user using a property prediction machine learning model based on the first set of golf swing data. In one embodiment, the program code is readable/executable by a processor for determining at least one pre-existing golf club, comprising predefined performance specifications, that is a best match for the user based on a comparison of the determined one or more optimal specifications of the at least one hypothetical golf club for the user to predefined performance specifications of a plurality of different pre-existing golf clubs.

In one embodiment, an apparatus includes means for receiving a first set of golf swing data for a user, the first set of golf swing data representative of one or more characteristics of a golf swing of the user. In one embodiment, the apparatus includes means for determining one or more optimal specifications of at least one hypothetical golf club that is a best fit for the user using a property prediction machine learning model based on the first set of golf swing data, the property prediction machine learning model specially trained using a second set of golf swing data to analyze golf swing data. In one embodiment, the apparatus includes means for determining at least one pre-existing golf club, comprising predefined performance specifications, that is a best match for the user based on a comparison of the determined one or more optimal specifications of the at least one hypothetical golf club for the user to predefined performance specifications of a plurality of different pre-existing golf clubs.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
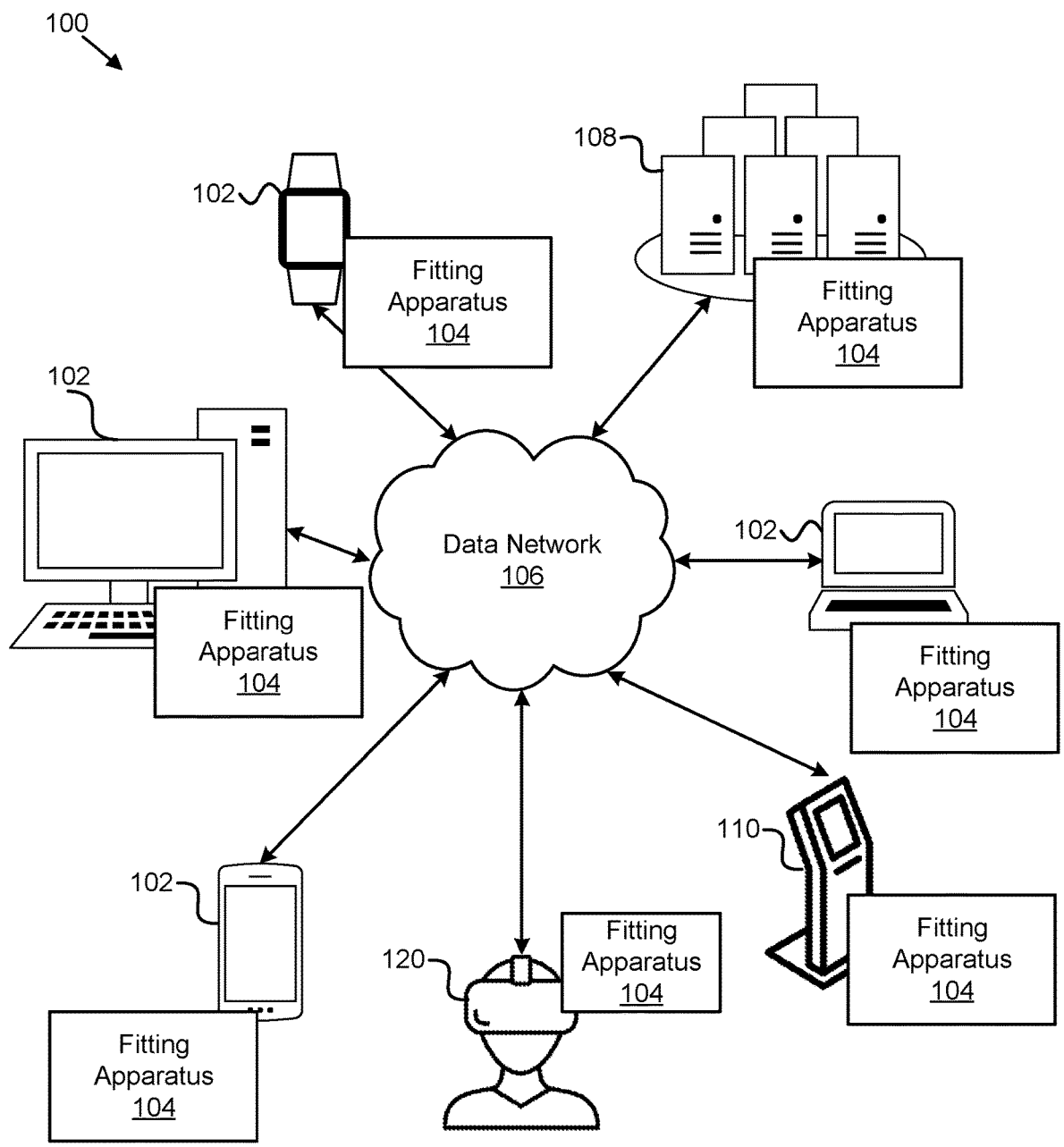
FIG. 1 is a schematic block diagram illustrating one embodiment of a system for a machine-learning-based club fitting platform.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 is a schematic block diagram illustrating one embodiment of a system 100 for providing a machine-learning-based golf club fitting. In one embodiment, the system 100 includes one or more computing devices 102, one or more fitting apparatuses 104, one or more data networks 106, one or more servers 108, and one or more kiosks 110. Additionally, in certain examples, the system 100 also includes one or more augmented-reality eyewear 120. In certain embodiments, even though a specific number of computing devices 102, fitting apparatuses 104, data networks 106, servers 108, kiosks 110 and/or augmented-reality eyewear 120 are depicted in FIG. 1, one of skill in the art will recognize, in light of this disclosure, that any number of computing devices 102, fitting apparatuses 104, data networks 106, servers 108, kiosks 110, and/or augmented-reality eyewear 120 may be included in the system 100.

The entirety of the fitting apparatus 104 can reside on one of the computing devices 102, the servers 108, the kiosk 110, or the augmented-reality eyewear 120. In one example, the entirety of the fitting apparatus 104 resides on the kiosk 110. However, in certain examples, the features of the fitting apparatus 104 are divisible and reside on two or more of the computing devices 102, the servers 108, the kiosk 110, or the augmented-reality eyewear 120. According to one example, some of the fitting apparatus 104 resides on the kiosk 110 and some of the fitting apparatus 104 resides on the augmented-reality eyewear 120. Although in FIG. 1, the fitting apparatus 104 is shown associated with each of the computing devices 102, the servers 108, the kiosk 110, or the augmented-reality eyewear 120, it is recognized that this merely symbolizes that the entirety of the fitting apparatus 104 or just a portion of the fitting apparatus 104 can reside on a given one of the computing devices 102, the servers 108, the kiosk 110, or the augmented-reality eyewear 120.

The computing device 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, headphones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, or the like.

In general, in various embodiments, the fitting apparatus 104 is configured to use machine learning to identify optimal specifications or characteristics of a golf club head, shaft, and/or grip for a user being fitted, based at least partially on a combination of historical and user-generated golf swing data, and recommending a particular golf club for use by the user by determining which one of many golf clubs have specifications that best fit the optimal specifications determined by the fitting apparatus 104. As defined herein, the user is the golfer being fitted unless otherwise noted. In one embodiment, the fitting apparatus 104 is configured to receive golf swing data for the user. The golf swing data includes one or more characteristics of the user's golf swing, whether manually inputted by the user, e.g., survey data, or detected/sensed using one or more sensors. The fitting apparatus 104 is also configured to determine one or more specifications of a golf club, optimized for the user, using a property prediction machine learning model based on the golf swing data. The fitting apparatus 104 is further configured to determine at least one pre-existing golf club of a plurality of pre-existing golf clubs, having specifications that best fit the user based on a comparison of the determined one or more optimal specifications of a golf club head, shaft, and/or grip to the specifications of the plurality of pre-existing golf clubs.

In certain embodiments, the fitting apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); or the like. A hardware appliance of the fitting apparatus 104 may include a power interface, a wired and/or wireless network interface, a graphical interface that attaches to a display, and/or a semiconductor integrated circuit device as described below, configured to perform the functions described herein with regard to the fitting apparatus 104.

The fitting apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the fitting apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the fitting apparatus 104.

The semiconductor integrated circuit device or other hardware appliance of the fitting apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the fitting apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, or the like. Functionally, the one or more servers 108 may be configured as mail servers, web servers, application servers, FTP servers, media servers, data servers, web servers, file servers, virtual servers, or the like. The one or more servers 108 may be communicatively coupled (e.g., networked) over a data network 106 to one or more computing devices 102.

In one embodiment, the computing device 102, the kiosk 110, or the augmented-reality eyewear 120 is communicatively coupled to one or more devices or servers 108 over a data network 106. More particularly, a feature or features of the fitting apparatus 104 executing on one or more of the computing device 102, the kiosk 110, or the augmented-reality eyewear 120 may be communicatively coupled to or in communication with the feature(s) of the fitting apparatus 104 executing on the server 108.

In some embodiments, the system 100 includes a golf fitting station, a golf simulator, one or more sensors, and/or the like. According to one example, the kiosk 110 includes a golf fitting station, a golf simulator, one or more sensors, and/or the like. However, in other examples, other features of the system 100, such as the augmented-reality eyewear 120, includes all of or just some of a golf fitting station, a golf simulator, one or more sensors, and/or the like. The kiosk 110 is either self-service (e.g., operable exclusively or partially by a user) or is managed by an attendee (e.g., a golf club fitter). In certain examples, the kiosk 110 is provided with the machine-learning-based club fitting platform described herein. In such an embodiment, the kiosk 110 may be used to capture the user's golf swing data, either in real-time via sensors, as the user is swinging a golf club, or as provided by the user via pre-existing data known to the user, and to predict which of a plurality of existing golf clubs are a best fit for the user using the fitting apparatus 104. The kiosk 110 may include a touch-enabled display, input and output devices (e.g., sensors), and/or the like for user interaction and data gathering.

In some examples, the augmented-reality eyewear 120, which includes or is communicatively connected to a fitting apparatus 104, is utilized during the golf club fitting process, as disclosed herein. More specifically, during the golf club fitting process, the augmented-reality eyewear 120 can be configured to detect characteristics of a user or a user's swing, which can be fed to the input receiving module 202, as described below. Additionally, or alternatively, the augmented-reality eyewear 120 can be configured to guide a user or a fitter through a club fitting process via visual or audio prompts, graphics, or other information communicated to the user. Additionally, or alternatively, the augmented-reality eyewear 120 can be configured to display, in real-time, results of swings, taken during the club fitting process, or overall results of the club fitting process. Accordingly, in some examples, the augmented-reality eyewear 120 is worn by a user, a fitter, or both a user and fitter, during a fitting process.

According to certain examples, the augmented-reality eyewear 120 is configured to be worn by a user so that lenses of the augmented-reality eyewear 120 sit in front of the eyes of the user, much like traditional eyewear (e.g., glasses, sunglasses, contact lenses). Although illustrated as glasses in FIG. 1, the augmented-reality eyewear 120 can be other types of eyewear, such as contact lenses. The lenses of the augmented-reality eyewear 120 include one or more screens configured to display computer-generated or digital information (e.g., graphics, images, videos, etc.) that overlay the user's physical or real world as viewed through the lenses. The augmented-reality eyewear 120 also includes a controller (e.g., processor and memory) that controls operation of the screens and what is displayed on the screens. Additionally, in some examples, the augmented-reality eyewear 120 includes one or more sensors, such as optical sensors, cameras, accelerometers (e.g., to measure head sway), radar, temperature sensors, wind sensors, and the like. The sensors detect conditions in the real world, which are used by the controller to generate the digital information and/or provide feedback to other components of the system 100.

The augmented-reality eyewear 120 further includes data transmission components that facilitate the wired or wireless transmission of data between the augmented-reality eyewear 120 and external devices, such as the kiosk 110, the computing devices 102, and the servers 108. In some examples, the augmented-reality eyewear 120 includes batteries, attached to an eyepiece of the augmented-reality eyewear 120 or to a strap (e.g., neck strap) of the augmented-reality eyewear 120. Examples of the hardware of the augmented-reality eyewear 120 can be associated with various augmented-reality eyewear, such as the HoloLens 2, manufactured by Microsoft, or Puttview Outdoor, manufactured by Puttview, which are incorporated herein by reference in their entirety. Examples of an augmented-reality eyewear 120 are shown and described below with reference to FIGS. 7 and 8.

Figure 2:
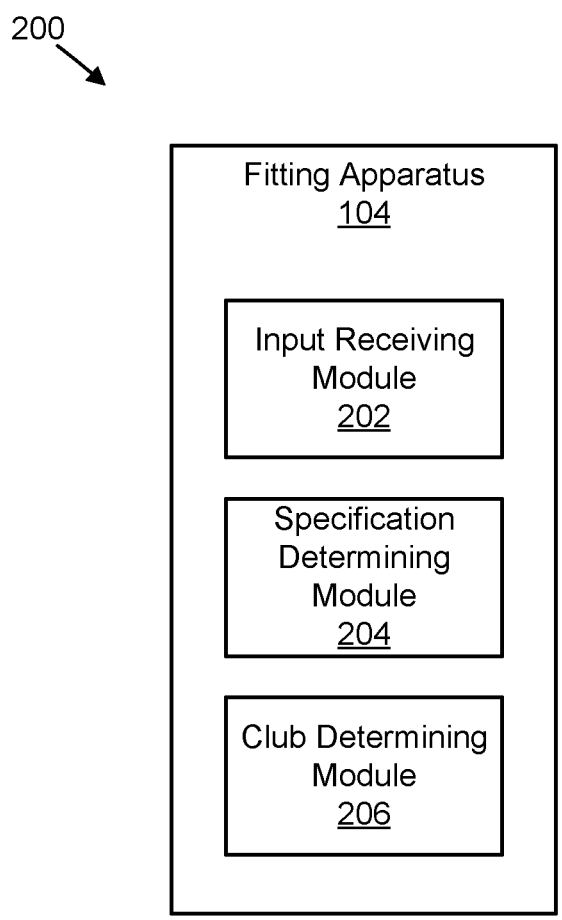
FIG. 2 is a schematic block diagram illustrating one embodiment of an apparatus for a machine-learning-based club fitting platform.

FIG. 2 depicts one embodiment of an apparatus 200 for machine-learning-based golf club fitting. In one embodiment, the apparatus 200 includes an embodiment of the fitting apparatus 104. According to certain examples, the fitting apparatus 104 includes one or more of an input receiving module 202, a specification determining module 204, and a club determining module 206, which are described in more detail below.

In one embodiment, the input receiving module 202 is configured to receive golf swing data associated with the user. In certain embodiments, the golf swing data describes one or more characteristics of a user's golf swing and one or more characteristics of the golf club swung by the user to generate the characteristics of the user's golf swing. The various characteristics of the golf club may include the make and model of the golf club, the type of club head (e.g., driver, fairway metal, hybrid, iron, etc.), the materials of the golf club head, the size of the golf club head, the weight distribution of the club head (e.g., the center of gravity ("CG") location, z-up value, moment of inertia, etc.), the loft of the golf club head, the characteristics of the shaft of the golf club (e.g., length, mass, tipping point, flex, etc.), the characteristics of the grip of the golf club (e.g., size, material, etc.), and/or the like.

In one embodiment, the characteristics of the user's golf swing may be determined based on sensed data. The sensed data, for instance, may include motion tracking data, e.g., sensor data that tracks a user's swing motion such as during a golf club fitting session. The motion tracking data may include the swing path of the golf club, the swing speed of the golf club, the angle of attack of the golf club head at impact, the loft of the golf club head at impact, the squareness of the golf club head at impact, and/or the like. The motion tracking data may also include ball data, such as the shot shape or path of the golf ball struck by the golf club, the spin rate and spin direction of the ball struck by the golf club, the speed of the ball struck by the golf club, the type of golf ball (e.g., material, layers, compression, etc.) and/or the like. The motion tracking data may also include impact location data, such as where on the club face the golf ball was struck.

Other golf swing data may include survey data, virtual club or swing characteristics, or the like that are collected from a website, mobile application, or the like. For instance, the input receiving module 202 may present a user with an interface, e.g., within a web browser or a mobile application, that includes a series of questions to collect information from the user regarding the user's golf swing, golf club preferences/properties, demographic/personal information (e.g., gender or handedness), goals related to the user's golf swing, or the like, which is used to recommend a golf club such as a driver, iron, wedge, or putter based on the received input.

In another example embodiment, the input receiving module 202 further receives demographic information for the user such as gender, height, weight, left- or right-handedness, age, and/or the like. The golf swing data may include responses to survey questions, e.g., preference data, opinion data, estimation data, or the like, such as "how many rounds of golf do you play a week, on average," "which club do you hit the best," "which club do you hit the worst," "what is your handicap, 0-5, 6-10, 11-15, 16-20, 21-25, 25+?," "what is your average/typical score, 71 or better, 72-79, 80-89, 90-99, 100-109, 110+?. The recommendation may provide a selection for a user to select that they typically play women's shafts or senior shafts.

Additional questions may include, "how far do you normally carry a 7-iron?," "what is your average driver distance?," "what is your typical driver shot shape, hook, fade, straight, draw, slice?," "what is your driver ball flight, lower (0-10 yards), low (10-20 yards), mid (20-30 yards), high (30-40 yards), higher (40+ yards)?," "what is your desired shot shape, fade, small fade, straight, small draw, draw?," "what is your desired shot consistency, or forgiveness on off center hits?"," and/or the like. In certain embodiments, the input receiving module 202 presents a graphical interface that includes different interactive interface elements that a user can use to provide responses to the survey questions such as radio buttons, sliders, buttons, and/or the like.

For instance, the interface may include prompts with sliders to adjust distance for 7 iron and/or driver distance, ball flight height, ball flight shape, or the like. The interface may also provide visual cues to indicate ball flight (e.g., a side profile showing various golf ball trajectories as they are hit down range), current shot shape (e.g. arrows bending to represent a fade or draw), and desired shot shape (e.g. bent arrows). These visual cues can better inform the person to be fit as to what the various selections represent. There may also be onscreen information to better explain why each factor or question is important and how the information is used. Additionally, the recommendation engine may provide a confidence score for each recommendation and alternative fitting options plus some explanation of the rationale for the recommendation (e.g., "you indicated you prefer a low flight and this shaft and head combination provide a low flight or low launch"). The recommendation engine may also provide product videos and information after the recommendation allowing the user to see head shaping from various views (e.g. address view, face view, and back view), and it may allow the user to manipulate a 3D rendering of the head.

The above questions may be well suited for fitting an entire bag or set of golf clubs, or just a single driver-type golf club. To fit a fairway-wood type golf club additional questions may include some or all of the above questions or just a subset of the above questions such as handedness, age, height, handicap/typical score, typical 7-iron carry or average driver distance plus fairway specific questions. For example, "Do you typically take a divot with your fairway woods?," "Do you struggle to get your fairway woods airborne?," "Do you hit your fairway woods mostly from the tee, the fairway, or both?," "What is your fairway wood ball flight?," and/or the like.

To fit an iron-type golf clubs, additional questions may include some or all of the above questions or just a subset of the above questions such as handedness, age, height, handicap/typical score, typical 7-iron carry or average driver distance plus iron specific questions. For example, "What is your divot type or what is your divot type with a 7-iron, deep, shallow, in between?," "What is the longest iron you feel comfortable playing?," "Do you prefer a blade, compact shape, a larger head, or no preference?," "What is more Important distance and forgiveness? Or, shot shaping/workability and compact look?" "What is your preferred ball flight, low, mid, or high?," and/or the like.

To fit a wedge-type golf club, additional questions may include some or all of the above questions or just a subset of the above questions such as handedness, age, height, handicap/typical score, typical 7-iron carry or average driver distance plus iron specific questions. For example, "Skill level with wedges relative to other golfers?," "Loft of pitching wedge (or most lofted iron set club)?," "Were you fit for your current irons?," "What shaft is currently in your irons?," "Were you fit for your current wedges?," "What lofted wedges do you currently play?," "Approximately how far do you hit your current wedges?," "Are any of the wedges you currently play customized?," "For each of your wedges, select the shot type and usage frequency and indicate if the shot types is a perceived strength or weakness" (shown in FIG. 11).

Open ended questions may also be presented, for example, "Describe your typical divot characteristics," "Describe the typical condition of the fairway you experience," "Describe the typical density of the rough you experience," "Describe the typical height of the rough you experience," "Describe the typical condition of the bunkers you experience," "Describe the typical green size you experience," "Describe the typical green firmness you experience," "What is the highest lofted wedge you would like to play?," "Rank wedge characteristics from 1-7 based on how important they are to you," or the like.

In one embodiment, the golf swing data may include information captured for one or more golf rounds played by the user, e.g., experiential data. For example, the data may include course information, the user's score for the round and/or on each hole, weather conditions (e.g., wind speed and direction), the shot chart for the round (e.g., the distances of the shots, shape of the shots, club hit for each shot, etc.), location information, and/or the like. One of skill in the art will recognize, in light of this disclosure, other golf swing data that may be captured, accessed, stored, analyzed, processed, and/or the like.

In one embodiment, the input receiving module 202 interfaces with a third-party server, datacenter, system, platform, or the like to access some of the user's golf swing data. For instance, the input receiving module 202 may access the user's golf swing data from a third-party programmatically via an application programming interface ("API"), via a file sharing system, via a website, and/or the like. In further embodiments, the input receiving module 202 may read data from an external device such as a USB drive, an external hard drive, a smart phone or other smart device with short-range data transmission capabilities, and/or the like. In some embodiments, the input receiving module 202 may receive the golf swing data from a remote or cloud data store where the user has uploaded their golf swing data.

In one embodiment, the specification determining module 204 is configured to determine one or more optimal specifications, properties, parameters, or the like, of a golf club for the user using a property prediction machine learning model that utilizes the golf swing data. The optimal specifications may be related to performance and/or presentation parameters for a golf club head, a golf club shaft, a golf club grip, a golf ball, and/or a combination of the foregoing. In other words, the optimal specifications may be for a golf club or golf club component that has specifications to achieve a desired or optimal outcome for the user, based on various parameters described above (e.g., launch, distance, accuracy, dispersion, goals, or the like).

Embodiments described herein may utilize data mining on the motion capture data to obtain patterns for users, equipment, or use the motion capture data or events of a given user or other user in particular embodiments of the invention. Data mining relates to discovering new patterns in large databases wherein the patterns are previously unknown. Many methods may be applied to the data to discover new patterns including statistical analysis, neural networks and artificial intelligence (AI) for example. Due to the large amount of data, automated data mining may be performed by one or more computers to find unknown patterns in the data. Unknown patterns may include groups of related data, anomalies in the data, dependencies between elements of the data, classifications and functions that model the data with minimal error or any other type of unknown pattern. Displays of data mining results may include displays that summarize newly discovered patterns in a way that is easier for a user to understand than large amounts of pure raw data. One of the results of the data mining process is improved market research reports, product improvement, lead generation and targeted sales. Generally, any type of data that will be subjected to data mining must be cleansed, data mined and the results of which are generally validated. Businesses may increase profits using data mining. Examples of benefits of embodiments of the invention include customer relationship management to highly target individuals based on patterns discovered in the data. In addition, market basket analysis data mining enables identifying products that are purchased or owned by the same individuals and which can be utilized to offer products to users that own one product but who do not own another product that is typically owned by other users.

For example, without limitation, one or more embodiments may use natural language processing, pattern matching, Bayesian networks, machine learning, neural networks, or topic models to analyze text or any other information.

As used herein, AI is broadly defined as a branch of computer science dealing in automating intelligent behavior. AI systems may be designed to use machines to emulate and simulate human intelligence and corresponding behavior. This may take many forms, including symbolic or symbol manipulation AI. AI may address analyzing abstract symbols and/or human readable symbols. AI may form abstract connections between data or other information or stimuli. AI may form logical conclusions. AI is the intelligence exhibited by machines, programs, or software. AI has been defined as the study and design of intelligent agents, in which an intelligent agent is a system that perceives its environment and takes actions that maximize its chances of success.

AI may have various attributes such as deduction, reasoning, and problem solving. AI may include knowledge representation or learning. AI systems may perform natural language processing, perception, motion detection, and information manipulation. At higher levels of abstraction, it may result in social intelligence, creativity, and general intelligence. Various approaches are employed including cybernetics and brain simulation, symbolic, sub-symbolic, and statistical, as well as integrating the approaches.

Various AI tools may be employed, either alone or in combinations. The tools may include search and optimization, logic, probabilistic methods for uncertain reasoning, classifiers and statistical learning methods, neural networks, deep feedforward neural networks, deep recurrent neural networks, deep learning, control theory and languages.

Machine learning plays an important role in a wide range of critical applications with large volumes of data, such as data mining, natural language processing, image recognition, voice recognition and many other intelligent systems. There are some basic common threads about the definition of ML. As used herein, ML is defined as the field of study that gives computers the ability to learn without being explicitly programmed. For example, for predicting traffic patterns at a busy intersection, it is possible to run through a machine learning algorithm/model with data about past or historical traffic patterns, e.g., to train the machine learning algorithm/model. The program can correctly predict future traffic patterns if it learned/trained correctly from past patterns.

There are different ways an algorithm can model a problem based on its interaction with the experience, environment, or input data. The machine learning algorithms may be categorized so that it helps to think about the roles of the input data and the model preparation process leading to correct selection of the most appropriate category for a problem to get the best result. Known categories are supervised learning, unsupervised learning, semi-supervised learning, and reinforcement learning.

(a) In supervised learning category, input data is called training data and has a known label or result. A model is prepared through a training process where it is required to make predictions and is corrected when those predictions are wrong. The training process continues until the model achieves a desired level of accuracy on the training data. Example problems are classification and regression.

(b) In unsupervised learning category, input data is not labelled and does not have a known result. A model is prepared by deducing structures present in the input data. Example problems are association rule learning and clustering. An example algorithm is k-means clustering.

(c) Semi-supervised learning falls between unsupervised learning (without any labeled training data) and supervised learning (with completely labeled training data). Researchers found that unlabeled data, when used in conjunction with a small amount of labeled data may produce considerable improvement in learning accuracy.

(d) Reinforcement learning is another category which differs from standard supervised learning in that correct input/output pairs are never presented. Further, there is a focus on on-line performance, which involves finding a balance between exploration for new knowledge and exploitation of current knowledge already discovered.

Certain machine learning techniques are widely used and are as follows: Decision tree learning, Association rule learning, Artificial neural networks, Inductive logic programming, Support vector machines, Clustering, Bayesian networks, Reinforcement learning, Representation learning, and Genetic algorithms. In certain embodiments, multiple machine learning algorithms may be applied using ensemble learning. As used herein, ensemble learning may refer to a machine learning technique that combines multiple algorithms to produce a single predictive model.

The learning processes in machine learning algorithms are generalizations from past experiences. After having experienced a learning data set, the generalization process is the ability of a machine learning algorithm to accurately execute on new examples and tasks. The learner needs to build a general model about a problem space enabling a machine learning algorithm to produce sufficiently accurate predictions in future cases. The training examples may come from some generally unknown probability distribution.

In theoretical computer science, computational learning theory performs computational analysis of machine learning algorithms and their performance. The training data set is limited in size and may not capture all forms of distributions in future data sets. The performance is represented by probabilistic bounds. Errors in generalization are quantified by bias-variance decompositions. The time complexity and feasibility of learning in computational learning theory describes a computation to be feasible if it is done in polynomial time. Positive results are determined and classified when a certain class of functions can be learned in polynomial time whereas negative results are determined and classified when learning cannot be done in polynomial time.

In one embodiment, the property prediction machine learning model is a machine learning or artificial intelligence model that is specially trained or customized to analyze golf swing data, as explained in more detail below. As used herein, a golf club can refer to the golf club in general or various components of the golf club such as the golf club head (such as when a user is only being fitted for a head), a golf club shaft (such as when a user is only being fitted for a shaft), and/or a golf club grip (such as when a user is only being fitted for a grip).

Thus, as described herein, machine learning algorithms may be trained using historical training data to generate a specialized, customized machine learning model for use in predicting, estimating, forecasting, or the like, outcomes. Examples of outcomes include, but are not limited to, optimal properties of a golf club head for use by the user. The optimal properties can include an optimal golf club head, an optimal golf club shaft, an optimal golf club grip, and/or the like. The machine learning algorithms utilize historical data and new input data, e.g., new golf swing data obtained during a fitting session, as described in more detail below. Periodically, the machine learning model may be refined or retrained based on new information or training data, e.g., new golf swing data, motion capture and tracking data, fitting data, club property data, and/or the like, whether obtained independently or via a third party source.

Thus, in one embodiment, the input receiving module 202 may provide the received golf swing data for a user to the property prediction machine learning model to determine, estimate, predict, forecast, or the like, the optimal specifications or properties of a theoretical golf club for use by the user, e.g., a driver, hybrid, fairway, iron, wedge, putter, and/or the like that is a best match for the user based on the golf swing data and other information. In essence, the specification determining module 204 predicts specifications and parameters generates an ideal golf club design that best suits, fits, matches, or the like, the particular swing characteristics of the user. The ideal golf club design includes the optimal values and selections for any of various general characteristics of a golf club, such as golf club head type, golf club shaft type, golf club grip type, and/or a combination of the foregoing. However, in certain examples, the ideal golf club design includes the optimal values and selections for any of various performance-driven characteristics of a golf club. The performance-driven characteristics of a golf club head may include the materials of the golf club head, the size of the golf club head, the weight distribution of the club head (e.g., the center of gravity location, z-up value, moment of inertia, characteristic time, etc.), the loft of the golf club head; the material, length, tipping point, etc. of the shaft; and/or the like.

Further, in one embodiment, the ideal golf club design includes the optimal values and selections for any of various presentation characteristics of a golf club. As used herein, presentation characteristics may refer to characteristics of the golf club while at rest on the ground, e.g., when addressing the golf ball. In other words, presentation may generally mean what is the club head doing just prior to impact and/or at impact. In one embodiment, therefore, presentation characteristics refer to dynamic head presentation. The presentation characteristics may include various parameters of the golf club head including the club head speed, smash factor, angle of attach, club path, face angle, loft and lie at impact, impact location on the club face, toe, crown, sole, face, heel, lie angle, loft angle, and/or the like.

As explained in more detail below, the property prediction machine learning model may be trained on many different properties of many golf club types, makes, models from many manufacturers. Accordingly, the property prediction machine learning model is able to forecast or estimate an optimal fit for a user, e.g., a theoretical golf club with optimal properties tailored to the particular swing characteristics of the user as determined from the golf swing data received by the input receiving module 202. Thus, the property prediction machine learning model may output different optimal values, qualities, quantities, variables, parameters, and/or the like for one or more different specifications (e.g., properties or characteristics) of a theoretical golf club.

The following table shows examples of different golf club parameters that may be included, analyzed, recommended, or the like for a golf club, a golf club head, a golf club shaft, a golf club grip, or the like:

TABLE 1

Golf Club Specifications

| HEAD PARAMETERS | |
|---|---|
| TOTAL MASS (w/snot) | Measure of a total mass of the golf club |
| VOLUME | Measure of the amount of space the golf club occupies |
| ADDRESS AREA | Measure of the area of the footprint of the golf club head at address |
| CGX | Position of center of gravity (CG) along x-axis of golf club head coordinate system |
| CGZ | Position of CG along z-axis of golf club head coordinate system |
| Z UP | Vertical distance of the CG above the ground plane |
| ASM DELTA-1 | Distance between the CG and the hosel axis along the y axis (in the direction straight toward the back of the body of the golf club face from the geometric center of the striking face) |
| ASM DELTA-2 | Distance between the CG and the hosel axis along the x-axis |
| ASM DELTA-3 | Distance between the CG and the hosel axis along the y-axis |
| Ixx | Moment of inertia about the heel/toe CG x-axis |
| Iyy | Moment of inertia about the front/back CG y-axis |
| Izz | Moment of inertia about the vertical CG z-axis |
| I HOSEL AXIS | Moment of inertia about the golf club head shaft axis |

TABLE 1-continued

Golf Club Specifications

| CG ANGLE | Angle between a first distance extending from a vertical shaft axis plan and a shaft-axis-intersection point and second distance extending from the shaft-axis intersection point to the CG |
|---|---|
| CFX | Center-face location on x-axis |
| CFY | Center-face location on y-axis |
| CFZ | Center-face location on z-axis |
| GND LOFT | Measure of the loft of the club head relative to the ground |
| LOFT (FA = 0) | Measure of the loft of the club head relative to the ground where the face angle = 0 |
| BODY LIE | Angle between club head and the ground |
| ASM LIE | Angle between center of the shaft and the ground |
| FACE ANGLE | Angle of the club head face relative to a ground plane |
| BULGE RADIUS | Measure of "roundedness" of the club head face from the heel to the toe |
| ROLL RADIUS | Measure of "roundedness" of the club head face from the crown to the sole |
| SOLE RADIUS | Measure of the radius of the sole |
| FACE HEIGHT | Height of the club head face parallel to the z-axis |
| FACE HEIGHT TOE | Measure of the face height of the toe |
| FACE WIDTH | Width of the club head face parallel to the x-axis |
| FACE LENGTH | Length of the club head face parallel to the y-axis |
| BALANCE POINT L | Balance point on a golf shaft |
| CG L | Center of gravity on a golf shaft |
| FACE AREA | Area of the club head face |
| FACE PROGRESSION | Measure of how far the geometric face center is in front of the vertical plane containing the shaft axis |
| CENTER FACE from GND | Distance between the ground and the center of the club head face |
| HEAD HEIGHT | Maximum above ground z-axis coordinate of the outer surface of the crown |
| HEAD WIDTH | Distance between the maximum extents of the heel and toe portions of the body measured along an axis parallel to the x-axis |
| HEAD LENGTH | Distance between the forwardmost and rearward most points on the surface of the body measured along an axis parallel to the y-axis |
| HOSEL TO BACK LENGTH | Distance between the bottom of the bore and the ground |
| HEAD HOSEL LENGTH | Insertion depth of the shaft into the head |
| BALANCE POINT (BP) UP | Distance from ground plane to the CG plane representing CG projection on the face plate |
| CG PROJECTED ON FACE | Point where CG intersects the club head face |
| CG PROJECTED DISTANCE TO CF | Distance between where the CG intersects the club head face and the center of the club head face |
| TOPLINE | The top of the club head directly adjacent the strike face |
| LEADING EDGE RADIUS | Measure of the radius of the leading edge |
| SHAFT PARAMETERS | |
| LENGTH | Measure of the length of the shaft |
| WEIGHT | Measure of the weight of the shaft |
| CGLOCATION | The location of the center of gravity of the shaft |
| TORQUE | Measure of the torque of the shaft |
| GRIP PARAMETERS | |
| MASS | Measure of the mass of the grip |
| CG | Measure of the center of gravity of the grip |
| LENGTH | Measure of the length of the shaft |

TABLE 1-continued

Golf Club Specifications

CLUB PARAMETERS

| | |
|---|---|
| LENGTH | Measure of the length of the club |
| LOFT | Measure of the loft of the club |
| LIE | Measure of the lie of the club |
| CLUB WEIGHT | Measure of the weight of the club |

The parameters in Table 1 are illustrative and may not be an exhaustive list of the various parameters, variables, or the like that may be used for the fitting system described herein. Other golf club and component parameters may be used such as 11, 12, 13, toe hang, scoreline lie, face height par, asm hosel length at asmlie, head hosel length at 60 deg, hosel diameter, hosel diameter top, hosel diameter bottom, hosel taper length, inset, bore diameter, bore depth, hosel post diameter, offset leadingedge, offset topline, blade length, face thickness min, face thickness max, face area internal, vft location vertical, vft location horizontal, topline width, sole width toe, sole width mid, sole width heel, bounce radius, bounce angle, toe to scoreline endctr, scoreline length, scoreline offset toe, scoreline offset topline, shaft progression, negative bounce, head base hosel length at 60 deg, head base hosel length, leading edge belly, sole camber, frontal resistance square, downward resistance square, total resistance square, frontal resistance delofted, downward resistance delofted, total resistance delofted, frontal resistance open, downward resistance open, total resistance open, sole attitude actual square, sole attitude effective square, leadingedge attitude actual square, leadingedge attitude effective square, sole attitude actual delofted, sole attitude effective delofted, leadingedge attitude actual delofted, leadingedge attitude effective delofted, sole attitude actual open, sole attitude effective open, leadingedge attitude actual open, leadingedge attitude effective open, inertia, buttflex, tipflexzero, tipflexfour, tipflexeight, tipflextwelve, frequency, swing weight, butt thickness, shaft butt od, swing weight tr, or the like, which are defined according to conventional standards known in the art.

Generally, as used herein, the center of gravity (CG) of a golf club head is the average location of the weight of the golf club head or the point at which the entire weight of the golf club-head may be considered as concentrated so that if supported at this point the head would remain in equilibrium in any position. A golf club head origin coordinate system can be defined such that the location of various features of the golf club head, including the CG, can be determined with respect to a golf club head origin positioned at the geometric center of the striking surface and when the club-head is at the normal address position (i.e., the club-head position wherein a vector normal to the club face substantially lies in a first vertical plane perpendicular to the ground plane, the centerline axis of the club shaft substantially lies in a second substantially vertical plane, and the first vertical plane and the second substantially vertical plane substantially perpendicularly intersect). The CG plane may refer to the distance from the ground plane to the Projected CG point, which may be an advantageous measurement of golf head playability, and may be represented by a CG plane that is parallel to the ground plane. The distance from the ground plane to this CG plane representing CG projection on the face plate may be referred to as the balance point up (BP Up).

The head origin coordinate system defined with respect to the head origin includes three axes: a head origin z-axis (or simply "z-axis") extending through the head origin in a generally vertical direction relative to the ground; a head origin x-axis (or simply "x-axis") extending through the head origin in a toe-to-heel direction generally parallel to the striking surface (e.g., generally tangential to the striking surface at the center) and generally perpendicular to the z-axis; and a head origin y-axis (or simply "y-axis") extending through the head origin in a front-to-back direction and generally perpendicular to the x-axis and to the z-axis. The x-axis and the y-axis both extend in generally horizontal directions relative to the ground when the golf club head is at the normal address position. The x-axis extends in a positive direction from the origin towards the heel of the golf club head. The y-axis extends in a positive direction from the head origin towards the rear portion of the golf club head. The z-axis extends in a positive direction from the origin towards the crown. Thus for example, and using millimeters as the unit of measure, a CG that is located 3.2 mm from the head origin toward the toe of the golf club head along the x-axis, 36.7 mm from the head origin toward the rear of the clubhead along the y-axis, and 4.1 mm from the head origin toward the sole of the golf club head along the z-axis can be defined as having a $CG_x$ of −3.2 mm, a $CG_y$ of +36.7 mm, and a $CG_z$ of −4.1 mm.

Further as used herein, Delta 1 is a measure of how far rearward in the golf club head body the CG is located. More specifically, Delta 1 is the distance between the CG and the hosel axis along the y axis (in the direction straight toward the back of the body of the golf club face from the geometric center of the striking face). It has been observed that smaller values of Delta 1 result in lower projected CGs on the golf club head face. Thus, for embodiments of the disclosed golf club heads in which the projected CG on the ball striking club face is lower than the geometric center, reducing Delta 1 can lower the projected CG and increase the distance between the geometric center and the projected CG. Note also that a lower projected CG can promote a higher launch and a reduction in backspin due to the z-axis gear effect. Thus, for particular embodiments of the disclosed golf club heads, in some cases the Delta 1 values are relatively low, thereby reducing the amount of backspin on the golf ball helping the golf ball obtain the desired high launch, low spin trajectory.

Similarly, Delta 2 is the distance between the CG and the hosel axis along the x axis (in the direction straight toward the back of the body of the golf club face from the geometric center of the striking face).

Adjusting the location of the discretionary mass in a golf club head as described herein can provide the desired Delta 1 value. For instance, Delta 1 can be manipulated by varying the mass in front of the CG (closer to the face) with respect to the mass behind the CG. That is, by increasing the mass behind the CG with respect to the mass in front of the CG, Delta 1 can be increased. In a similar manner, by increasing the mass in front of the CG with the respect to the mass behind the CG, Delta 1 can be decreased.

In terms of the moment of inertia ("MOI") of the club-head (i.e., a resistance to twisting) it is typically measured about each of the three main axes of a club-head with the CG as the origin of the coordinate system. These three axes include a CG z-axis extending through the CG in a generally vertical direction relative to the ground when the golf club head is at normal address position; a CG x-axis extending through the CG origin in a toe-to-heel direction generally parallel to the striking surface (e.g., generally tangential to the striking surface at the club face center), and generally perpendicular to the CG z-axis; and a CG y-axis extending through the CG origin in a front-to-back direction and generally perpendicular to the CG x-axis and to the CG z-axis. The CG x-axis and the CG y-axis both extend in generally horizontal directions relative to the ground when the golf club head is at normal address position. The CG x-axis extends in a positive direction from the CG origin to the heel of the golf club head. The CG y-axis extends in a positive direction from the CG origin towards the rear portion of the golf club head. The CG z-axis extends in a positive direction from the CG origin towards the crown. Thus, the axes of the CG origin coordinate system are parallel to corresponding axes of the head origin coordinate system. In particular, the CG z-axis is parallel to the z-axis, the CG x-axis is parallel to the x-axis, and CG y-axis is parallel to the y-axis.

Specifically, a golf club head has a moment of inertia about the vertical CG z-axis ("Izz"), a moment of inertia about the heel/toe CG x-axis ("Ixx"), and a moment of inertia about the front/back CG y-axis ("Iyy"). Typically, however, the MOI about the CG z-axis (Izz) and the CG x-axis (Ixx) is most relevant to golf club head forgiveness.

A moment of inertia about the golf club head CG x-axis (Ixx) is calculated by the following Equation Ixx=J(y²+z²) dm, where y is the distance from a golf club head CG xz-plane to an infinitesimal mass dm and z is the distance from a golf club head CG xy-plane to the infinitesimal mass dm. The golf club head CG xz-plane is a plane defined by the golf club head CG x-axis and the golf club head CG z-axis. The CG xy-plane is a plane defined by the golf club head CGx-axis and the golf club head CG y-axis.

Similarly, a moment of inertia about the golf club head CG z-axis (Izz) is calculated by the following Equation Izz-J(x²+y²)dm, where x is the distance from a golf club head CG yz-plane to an infinitesimal mass dm and y is the distance from the golf club head CG xz-plane to the infinitesimal mass dm. The golf club head CG yz-plane is a plane defined by the golf club head CG y-axis and the golf club head CG z-axis.

In certain embodiments, the specifications may include a movable weight setting for a golf club. As used herein, a moveable weight may be a weight component of a golf club, e.g., of the club head, that is adjustable, movable, or the like. In such an embodiment, the specification determining module 204 may determine an optimal golf club for the user based on different settings/locations of the movable or adjustable weight(s).

In one embodiment, the specification determining module 204 assigns weights to various specifications of the theoretical golf club. Such a weighting indicates, signifies, or otherwise designates an importance of a particular specification of the theoretical golf club relative to another one or more specifications. For instance, the property prediction machine learning model may use default or equal weights for the various parameters/specifications that the model analyzes, e.g., the default weights may all be 0, 50 out of 100, or other value or scaling factor. However, the specification determining module 204 may adjust these weights according to an importance of certain specifications (e.g., as set by a user). For instance, if the center of gravity for a club head is more important than other golf club specifications, then the specification determining module 204 may assign a higher weight to the center of gravity parameter (or adjust a weighting value so that it is higher than other parameters) that the property prediction machine learning model uses when determining the optimal specifications of the club head for the user.

Similarly, the specification determining module 204, in one embodiment, assigns weights to various parameters of the golf swing data for the user. For instance, a fitting administrator, a trainer, or the like may specify that the user's age and gender is more important than other demographic data, and that various parameters of the user's previous fitting data is more important than other fitting parameters. Accordingly, the specification determining module 204 may adjust these weights according to provided values, scaling factors, or the like. Subsequently, the adjusted weights are provided to or set in the property prediction machine learning model and used to determine the one or more optimal specifications of the theoretical golf club for the user.

In further embodiments, the specification determining module 204 defines one or more specifications for the property prediction machine learning model that correspond to the plurality of different pre-existing golf clubs, and a scaling factor for each of the one or more specifications may be used to set the importance or weight of the specifications. For instance, if a particular club head model or type is desired, the specification determining module 204 may set the scale that corresponds to that particular club head to a value that outweighs any of the other club head types so that the property prediction machine learning model determines optimal specifications for the user relative to that particular club head type.

In one embodiment, the specification determining module 204 may determine one or more optimal specifications associated with one or more adjustable settings of the golf club, e.g., the head, the shaft, the grip, or the like. For instance, the one or more optimal settings may include adjustable settings for the flight angle, direction, or other flight control technology (FCT) settings that are controlled via adjustable weight settings, adjustable shaft settings (e.g., to adjust loft or lie), or the like.

For instance, a player with a lower handicap may prefer or benefit from having a club with adjustability, such as an adjustable CG (either front back) to adjust spin and inertia independent of loft, or adjustability of CG side to side (heel/toe) to adjust the CG to better align with a player's impact location or to adjust fade/draw bias. Or adjustments related to loft, lie, or face angle to help dial in spin and launch conditions or even appearance of face at address e.g., some golfers may appreciate/prefer a more open looking club head at address or a more closed looking club head at address.

However, other players may prefer to have no adjustability. This information may be gathered through the various means described above and provided to the machine learning to generate optimal specifications/preferences and recommendations for a hypothetical golf club or golf club component that includes adjustable settings. However, there are some trends for certain golfers that prefer less adjustability, and a recommendation engine may take these trends into account when making a recommendation. These trends of desiring less or no adjustability may include golfers that fall into one or more of the following categories such as higher handicap players, beginners (length of time playing the game), self-described skill level, or the like; age, height, and gender may also be a factor as well. Less technology inclined players may find adjustability unnecessary, daunting, or confusing, and may fear making any adjustments will "break" the equipment or have a belief that the club head should be made right to begin with. Accordingly, the recommendation engine may recommend a non-adjustable or less adjustable club head e.g. driver, fairway, hybrid type golf club head to these players. Even certain regions of the world or countries may prefer a non-adjustable shaft option over an adjustable shaft option and so region of the world or country may influence a recommendation. Thus, the specification determining module 204 may provide a range of optimal settings for clubs that have mechanisms for adjusting settings.

In one embodiment, the specification determining module 204 may limit the predictions e.g., the optimal settings, parameters, or the like of the optimal hypothetical club based on various pre-defined or user-defined factors. For instance, the specification determining module 204 may limit the predictions that based on performance characteristics from prior club usage (e.g., historical data) relative to the optimal settings based on known specification performance. Further, goal data or information may be used to limit or guide the predictions that the specification determining module 204 makes. For instance, the user may provide goal information such as a desired distance, direction, handicap, or the like, which the specification determining module 204 may use to determine the optimal specifications or settings of the hypothetical golf club. Thus, the user's goal information may change which club is determined as the optimal club for the user.

In certain embodiments, the specification determining module 204 may calculate or determine error values, e.g., confidence values, for the generated predictions. In such an embodiment, the specification determining module 204 may limit the predictions that are made based on the error values for the predictions (e.g., if an error value exceeds a threshold error, the associated prediction may be considered an outlier and ignored or discarded). In such an embodiment, the amount of acceptable error or tolerance (e.g., an error threshold or a confidence threshold) may be set or determined based on a scale or range, e.g., a standard deviation, that can dynamically change or adjust based on user input, a tolerance value typically associated with the particular setting, and/or the like.

In one embodiment error calculations are based on predictions (e.g., optimal with a weighting element or factor). For instance, the error may be calculated as $\Sigma_{i=1}^{n} z_i *(\text{prediction}-\text{optimal})^2$ where n is the number of parameters we are looking to optimize against. More importance parameters, variables, or the like can be indicated and tuned using the $z_i$ weightings. In one embodiment, errors are normalized to have zero mean with a standard deviation of one. In certain embodiments, the error calculation includes a scaling value, which enables performance metrics to be amplified or reduced. For example, if backspin is 4000+ rpms for a golfer, this may be the biggest performance metric that could be altered to improve performance and thus the scaling factor for backspin may be increased.

In one embodiment, the club determining module 206 is configured to determine at least one pre-existing golf club that has predefined performance specifications that are a best fit for the user based on a comparison of the determined one or more optimal specifications of the theoretical golf club for the user to predefined performance specifications of a plurality of different pre-existing golf clubs.

For instance, using or referencing a data store of a plurality of different, existing golf clubs that are provided by various manufacturers (e.g., different product lines), the club determining module 206 may use the output from the property prediction machine learning model to compare and identify or match the optimal specifications of the golf clubs to the existing golf clubs in the data store. If an exact match is found, the club determining module 206 may output the golf club that is the exact match.

Each golf club, however, may have multiple different specifications. In such an embodiment, the club determining module 206 may attempt to identify a golf club that is the best fit or match based on the optimal specifications output from the property prediction machine learning model. For each golf club, the club determining module 206 may perform a data analysis of the output from the property prediction machine learning model, such as a linear regression, or the like, relative to the specifications for the existing golf clubs to determine a best fit golf club for the user, or a plurality or ranking of golf club that are a best fit for the user. In some embodiments, the club determining module 206 may identify existing golf clubs that have specifications that are within a predetermined threshold of the determined optimal specifications. Moreover, the club determining module 206 may identify golf clubs that have adjustable settings that can be set to the optimal settings. One of skill in the art will recognize, in light of this disclosure, other means for determining a best fit golf club for the user based on the machine learning output and the specifications for existing golf clubs.

In one example embodiment, the club determining module 206 may cross-reference the output of the specification determining module 204 (the output describing the optimal hypothetical club for the user) with various parameters or specifications of the existing product or product line, including the head model, the head loft, the individual head SKU, the set makeup (multiple head SKUs), the FCT position, the weight position, the loft, the lie, the bounce, the putter neck style/toe hang, the shaft brand, the shaft model, the shaft flex, the grip brand, the grip model, the grip size, the number of grip tape wraps, the club length, the shaft tipping, the club swing weight, and/or the like.

For example, when recommending the parameters of a club head, the specification determining module 204 may recommend a CGx of a specific value. When finding the closest offering from potential recommendations, the club determining module 206 searches for club heads with CGx parameter values and weight positions that correspond to the recommended CGx.

In another example, for FCT position, from a parameter perspective, the specification determining module 204 would determine a particular/optimal loft, lie, and face angle, but the club determining module 206 may generate a final recommended club that expresses those parameters through the FCT sleeve position.

In one example embodiment, a golfer may enter a kiosk 110 or other platform to get fitted for a golf club such as a driver, iron, wedge, putter, hybrid, fairway wood, or the like. The golfer may enter information into the kiosk 110 (e.g., preference information, performance information, goal information, or the like) provide information to the kiosk (e.g., sensed data, motion data, tracking data, previous fitting data, or other performance data), which the input receiving module 202 receives, as described above, and based on the information, the specification determining module 204 determines an optimal, hypothetical golf club for the golfer. The optimal, hypothetical golf club, as described above, may include a configuration of optimal golf club components such as a golf club head, shaft, grip, or the like. Further, for example, the optimal, hypothetical golf club may include or be selected from a set of 12-14 golf clubs, a set of 5-8 irons (e.g., 4-PW), a set of 5-11 irons (e.g., 4-PW plus wedges), or the like. The club determining module 206 determines an existing golf club that is a best match or fit for the golfer relative to the optimal golf club, as described above.

To further refine and converge on the best possible match or fit for the golfer, the golfer may take a plurality of swings with the determined existing golf club. The input receiving module 202 may receive tracking, motion, or other sensed data from the plurality of swings and/or the golfer may provide feedback at the kiosk 110 regarding the determined golf club. In such an embodiment, the specification determining module 204 takes the new data and refines the optimal, hypothetical golf club for the golfer and the club determining module 206 determines an existing golf club that is a best match or fit for the golfer relative to the optimal golf club, which may be the same golf club or a different golf club.

If a different golf club is recommended, the golfer may take a plurality of swings with the different golf club, which the input receiving module 202 may monitor to capture tracking, motion, or other sensed data from the plurality of swings. The newly captured data may again be provided to the specification determining module 204 to refine the optimal, hypothetical golf club for the golfer and the club determining module 206 determines an existing golf club that is a best match or fit for the golfer relative to the optimal golf club, and so on, until the process converges on one or a set of existing golf club that are a best fit or match for the golfer. In certain embodiments, the different golf club that is recommended may include one or more of the same specifications of the previous golf club, e.g., may be a driver or iron with the same golf club head, but changing some other parameter, such as the golf club shaft or the grip size. Thus, the fitting system described herein may be used to determine a best fit golf club for a user, or determine a best fit component such as a particular shaft, head, grip, ball, or the like for the user, keeping other components the same.

In this manner, the fitting apparatus 104 can determine an optimal golf club setup and fitting for a user, based on golf swing data for the user, using a machine learning model and identify existing golf clubs that are a best fit or match for the user relative to the optimal golf club setup. In one embodiment, the fitting apparatus 104 may present or display the determined best fit or match club(s) to a user, e.g., within an interface such as a website, a mobile application, and/or the like In one example embodiment, as a driver fitting tool, e.g., for a main driver or a fairway driver, the fitting apparatus 104 may determine and/or recommend a driver type golf club head to a user from at least three different driver type golf club heads. In such an embodiment, the at least three different driver type golf club heads includes a first driver type golf club head, a second driver type golf club head, and a third driver type golf club head.

In one embodiment, the first driver type golf club head, the second driver type golf club head, and the third driver type golf club head one or more distinct parameters, e.g., a different volume, delta 1, Zup, BP projection, inertia Ixx, inertia Izz, CGx, or the like. In one example embodiment, one parameter may include a low spin/low launch parameter, one parameter is high inertia parameter, one parameter is a draw bias parameter, and/or the like.

In one embodiment, the first driver has a first volume ($V_1$), a first head mass ($m_1$), a first delta 1 ($d1_1$), a first Ixx ($Ixx_1$), a first Izz ($Izz_1$), a first CG projection onto the face measured relative to a standardized geometric center of the face ($CGproj_1$) (e.g., a standard for a golf course or a golf association such as the United States Golf Association, the Professional Golfers' Association, and/or the like), a first CGx ($CGx_1$), or the like. In one embodiment, the second driver has a second volume (V2), a second head mass (m2), a second delta 1 ($d1_2$), a second Ixx ($Ixx_2$), a second Izz ($Izz_2$), a second CG projection onto the face measured relative to a standardized geometric center of the face ($CGproj_2$), a second CGx ($CGx_2$), or the like. In one embodiment, the third driver has a third volume ($V_3$), a third head mass ($m_3$), a third delta 1 ($d1_3$), a third Ixx ($Ixx_3$), a third Izz ($Izz_3$), a third CG projection onto the face measured relative to a standardized geometric center of the face ($CGproj_3$), a third CGx ($CGx_3$), or the like.

In one embodiment, at least one of the first volume ($V_1$), the first head mass ($m_1$), the first delta 1 ($d1_1$), the first Ixx ($Ixx_1$), the first Izz ($Izz_1$), the first CG projection onto the face measured relative to a standardized geometric center of the face ($CGproj_1$), the first CGx ($CGx_1$), or the like, is less than the second volume ($V_2$), the second head mass ($m_2$), the second delta 2 ($d1_2$), the second Ixx ($Ixx_2$), the second Izz ($Izz_2$), the second CG projection onto the face measured relative to a standardized geometric center of the face ($CGproj_2$), the second CGx ($CGx_2$), or the like, OR the third volume ($V_3$), the third head mass ($m_3$), the third delta 1 ($d1_3$), the third Ixx ($Ixx_3$), the third Izz ($Izz_3$), the third CG projection onto the face measured relative to a standardized geometric center of the face ($CGproj_3$), the third CGx ($CGx_3$), or the like.

In one embodiment, two different drivers could be determined or recommended, e.g., one that has a low launch or low spin version that may be smaller volume, a core driver, and either a forgiving club (e.g., a club with max inertia) or a draw version club (e.g., a club where CGx is shifted towards the hosel) and Zup is greater. For a draw bias, the topline could be shifted to promote a draw bias. For a fairway driver, a similar pattern may be followed. For example, low forward CG is low spin and generally lower inertia. A more forgiving version may have a larger delta 1, larger inertia, and a higher spin rate.

As it relates to iron-type clubs, in one embodiment, sole width (small sole width for better players), topline width (small topline width for better players) may be included and delta 1 will tend to be farther back for more forgiving irons and Zup will be lower. In one embodiment, CGx likely doesn't not follow the same trend for irons. Generally, for more forgiving irons, the CGx is closer to zero (center face), and for less forgiving irons, CGx is closer to the hosel. Likely higher Zup for better player and a lower Zup for higher handicap (low Zup tends to help with launching a ball in the air).

As it relates to wedge-type clubs, in one embodiment, a bounce measurement may be included. Further, a higher Zup for a better player and lower Zup for higher handicap player (low Zup tends to help with launching a ball in the air). Better players tend to prefer a low penetrating wedge shot.

In one embodiment, at least two shafts and or at least two grips may be determined and recommended—one shaft or grip that is an upgrade shaft/grip (e.g., upgrade from a stock shaft/grip) and/or one shaft/grip that is a no cost shaft/grip (e.g., a shaft/grip that does not add to the total cost of the golf club).

In certain embodiments, at least a portion of the fitting apparatus 104 resides on or is located on a remote or cloud device. In such an embodiment, processing may be offloaded to the remote device, such as machine learning processing. A fitting apparatus 104 on a remote device, for instance, may receive golf swing data for the user, historical golf swing data, golf swing data for other users, or the like, may process the data (based on a given task, job, or applications (fitting)), and may return one or more results. In this manner, more intense or complex jobs or tasks can be offloaded to a remote device, which may have more resources, processing, or the like, without bogging down a local system, such as a kiosk 110.

Figure 3:
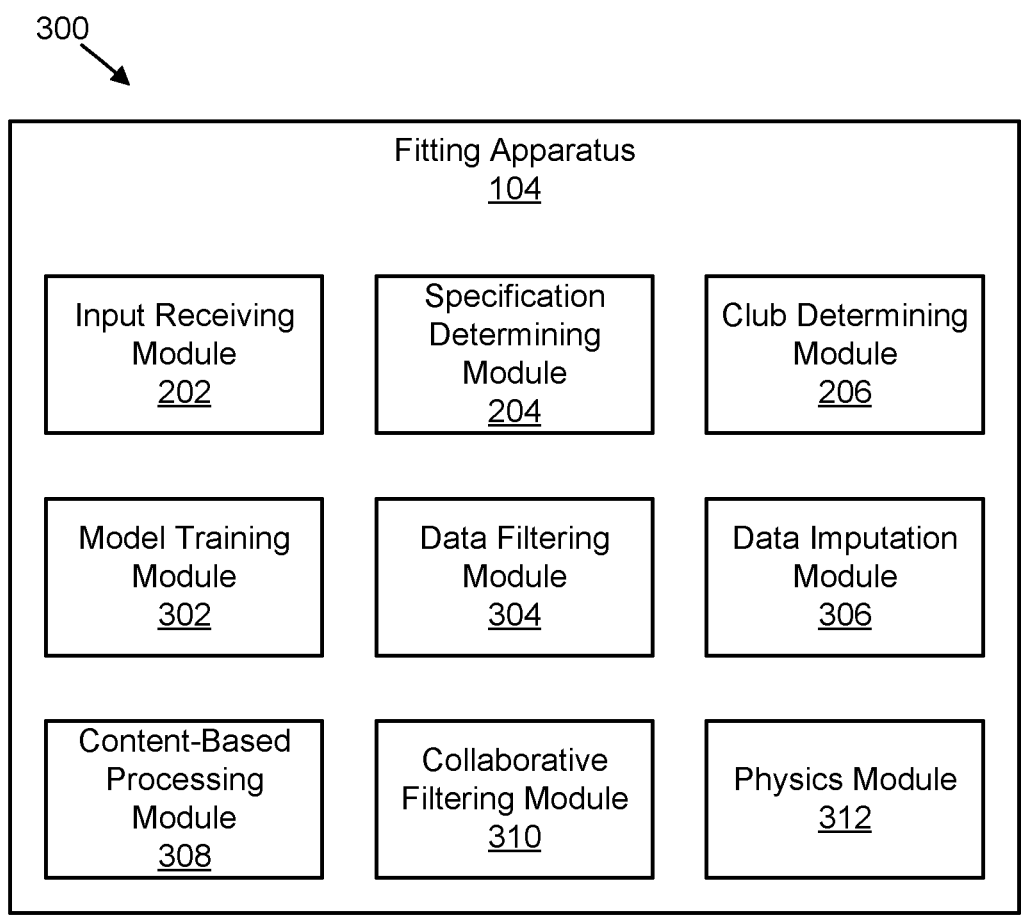
FIG. 3 is a schematic block diagram illustrating one embodiment of another apparatus for a machine-learning-based club fitting platform.

FIG. 3 depicts one embodiment of an apparatus 300 for machine-learning-based golf club fitting. In one embodiment, the apparatus 300 includes an embodiment of the fitting apparatus 104. In one embodiment, the fitting apparatus 104 includes one or more of an input receiving module 202, a specification determining module 204, and a club determining module 206, which may be substantially similar to the input receiving module 202, the specification determining module 204, and the club determining module 206 described above with reference to FIG. 2. In further embodiments, the fitting apparatus 104 includes one or more of a model training module 302, a data filtering module 304, a data imputation module 306, a content-based processing module 308, a collaborative filtering module 310, and a physics module 312, which are described in more detail below.

In one embodiment, the model training module 302 is configured to receive historical golf swing data and train the property prediction machine learning model for the user based on the received historical golf swing data. In one embodiment, the historical golf swing data includes prior fitting data, demographic data, motion capture data, test data, experiential data, sensed data, data captured using the augmented reality eyewear 120, and/or the like. In certain embodiments, the historical golf swing data may be for the current user and/or may include data from other users, e.g., historical swing data from other golfers in general, other golfers with similar golf swing data or other golf characteristics (e.g., similar handicaps, golf club usage, etc.), other golfers with similar demographic information (e.g., age, weight, height, etc.), and/or the like.

For example, the historical data may include (1) properties and specification data for existing golf clubs; (2) fitting data about different golfers (e.g., amateurs and professional golfers) including demographic data, shot data, club head presentation data, ball information, club recommendations for a golfer, club purchases that the golfer made, and/or the like; (3) player test data including a golfer's background information, a particular club that was hit, ball information describing how the ball was hit, club head presentation data, and/or the like; (4) motion analysis data; (5) data captured during a golfer's round of golf, including course data, which clubs were hit at which locations, and/or the like; and/or (6) research and development test data such as robot data, beta testing data, and/or the like.

In one embodiment, the data filtering module 304 is configured to clean the user data and/or the historical golf swing data prior to using the data for predictions and/or for training the property prediction machine learning model by removing outlier data points from the golf swing data. The outlier data points may include data points that do not fit a statistical model for the data or that have otherwise been identified as not adding valuable, usable data to the data set. In such an embodiment, the data filtering module 304 may analyze each data point for each shot for each club for each golfer in the historical data and flag or remove data points that have zero key data fields, e.g., head presentation data is missing, various swing parameters are missing, or the like. In such an embodiment, the data filtering module 304 identifies data points that are missing within the golf swing data for the user, the historical golf swing data, or a combination thereof.

To fill-in the missing values and generate as accurate of predictions/estimates as possible for training the property prediction machine learning model, the data imputation module 306 is configured to provide the golf swing data for the user, the historical golf swing data, or a combination thereof with the missing data points to an input prediction machine learning model for estimating values for the identified data points that are missing.

In one embodiment, the input prediction machine learning model may include a machine learning model that is specially configured or customized to identify the missing values for various parameters and determine or estimate values for the missing parameters based on the historical golf swing data, e.g., analyzing data for golfers that have similar data, e.g., demographic data, to the golfer who has data missing, analyzing data for golf clubs that are similar to other golf clubs, and/or the like.

In one embodiment, if the data filtering module 304 is unable to clean the input data, e.g., is unable to fill-in or estimate the missing values, or if a threshold number of values are outlier values, the data filtering module 304 may generate, return, transmit, or the like an error, message, notification, or the like that indicates that the input data is not good, unclean, insufficient, not complete, or the like.

The data imputation module 306, in certain embodiments, may use other data sources to backfill data that is missing from a different data source. For instance, a fitting data set for a golfer may be missing swing information, but the swing information may be available from a motion tracking data source, which may be used to backfill the missing values in the fitting data set. Various data sources, as described herein, may be used to backfill the missing values. If multiple data sources are available, the input prediction machine learning model may be used to analyze and process the multiple data sources and backfill the missing values with a best or optimal estimate, projection, forecast, or the like.

In one embodiment, the content-based processing module 308 is configured to determine the one or more optimal specifications of the at least one golf club for the user using a content-based machine learning model that predicts various metrics. For instance, the content-based machine learning model may predict a strokes gained metric for one or more different golf clubs based on historical player performance data and the predefined performance specifications of a plurality of different pre-existing golf clubs. As used herein, a strokes gained metric is calculated by comparing a player's score, or aspects of the player's score/performance (e.g., putting, tee-to-green, or the like), to the field average. The content-based processing module 308 may predict other metrics such as a dispersion area/pattern, launch windows, carry distance, total distance, carry dispersion, total dispersion, backspin, sidespin, launch angle, deviation angle and/or the like.

In one embodiment, the content-based processing module 308 is configured to determine the one or more optimal specifications of the at least one golf club for the user based on predicting the metric, e.g., strokes gained, dispersion area/pattern, launch window, or the like, for a plurality of other golfers using the content-based machine learning model and determining which of the plurality of other golfers most closely resembles the user. In such an embodiment, the golf club specifications for the determined other golfer are used to determine the one or more optimal specifications of the golf club for the user.

In one embodiment, the content-based machine learning model is trained using historical golf data that includes performance information for a plurality of different golfers and the types of golf clubs that the other golfers used to hit shots on a particular hole. The historical data may describe characteristics of the golf clubs that are hit, e.g., the strokes gained or loss using those golf clubs, as compared to another golfer, as compared to a group of other golfers, or the like. Accordingly, the golf swing data that the input receiving module 202 receives can include the user's performance data on the same holes, the same course, a similar hole or a similar course, which is then used by the content-based machine learning model to determine, predict, estimate, or the like specifications for golf clubs that will increase the users score as compared to their current golf club setup. The specification determining module 204, in one embodiment, may use the output from the content-based machine learning model as input to further estimate or determine the optimal specifications for golf clubs for the user.

In one embodiment, the collaborative filtering module 310 is configured to determine the one or more optimal specifications of the at least one golf club for the user using a collaborative filtering machine learning model. As used herein, collaborative filtering may refer to the process of filtering for information or patterns using techniques involving collaboration among multiple agents, viewpoints, data sources, etc. In other words, collaborative filtering is a method of making predictions (filtering) about the interests, likes, preferences, or the like of a user from many other users. For example, if a person A has the same opinion as a person B on an issue, A is more likely to have B's opinion on a different issue than that of a randomly chosen person. These predictions are specific to the user, but use information gleaned from many users. As it relates to the subject matter herein, collaborative filtering may be used to predict a plurality of pre-existing golf clubs, golf club preferences, golf club specifications, and/or the like for the user based on golf-related information of other similar users such as historical golf club purchase information, historical golf club recommendation information, historical golf club usage information, or a combination thereof.

The collaborative filtering machine learning model may be trained using historical purchase and/or recommendation data for other golfers who may be similar to the user in terms of demographics, handicap, golf club preferences, golf club usage, or other performance or preference information. Accordingly, the input receiving module 202 may provide the user's previous golf club usage, purchase, and/or recommended golf club information to the collaborative filtering machine learning model to determine, predict, or identify optimal and/or pre-existing clubs that can be recommended to the user based on the other similar users' previous golf-related information such as golf club purchase information, golf club preference information, golf club usage information, and/or golf club recommendation history. The specification determining module 204, in one embodiment, may use the output from the collaborative filtering machine learning model as input to further estimate or determine the optimal specifications for golf clubs for the user, e.g., to narrow the scope of the analysis to just the golf clubs that the collaborative filtering machine learning model identifies.

In one embodiment, the physics module 312 is configured to determine various physics-based parameters of the property prediction machine learning module (or other machine learning models described above) to select, weight, optimize, or the like for the user. This may be applicable if one or more convergence layers are added into the machine learning models (e.g., in a neural network). For example, the golf club recommendations may be generated or updated based on which physics-based parameters are desired to be optimized (e.g., weighted higher than other parameters) for a golfer. For a driver, the launch angle, backspin, ball speed (e.g., center face vs heel toc), and sidespin parameters may be optimized. For wedges, launch angle, backspin, and angle of attack may be optimized e.g., when selecting a bounce/grind.

Figure 4A:
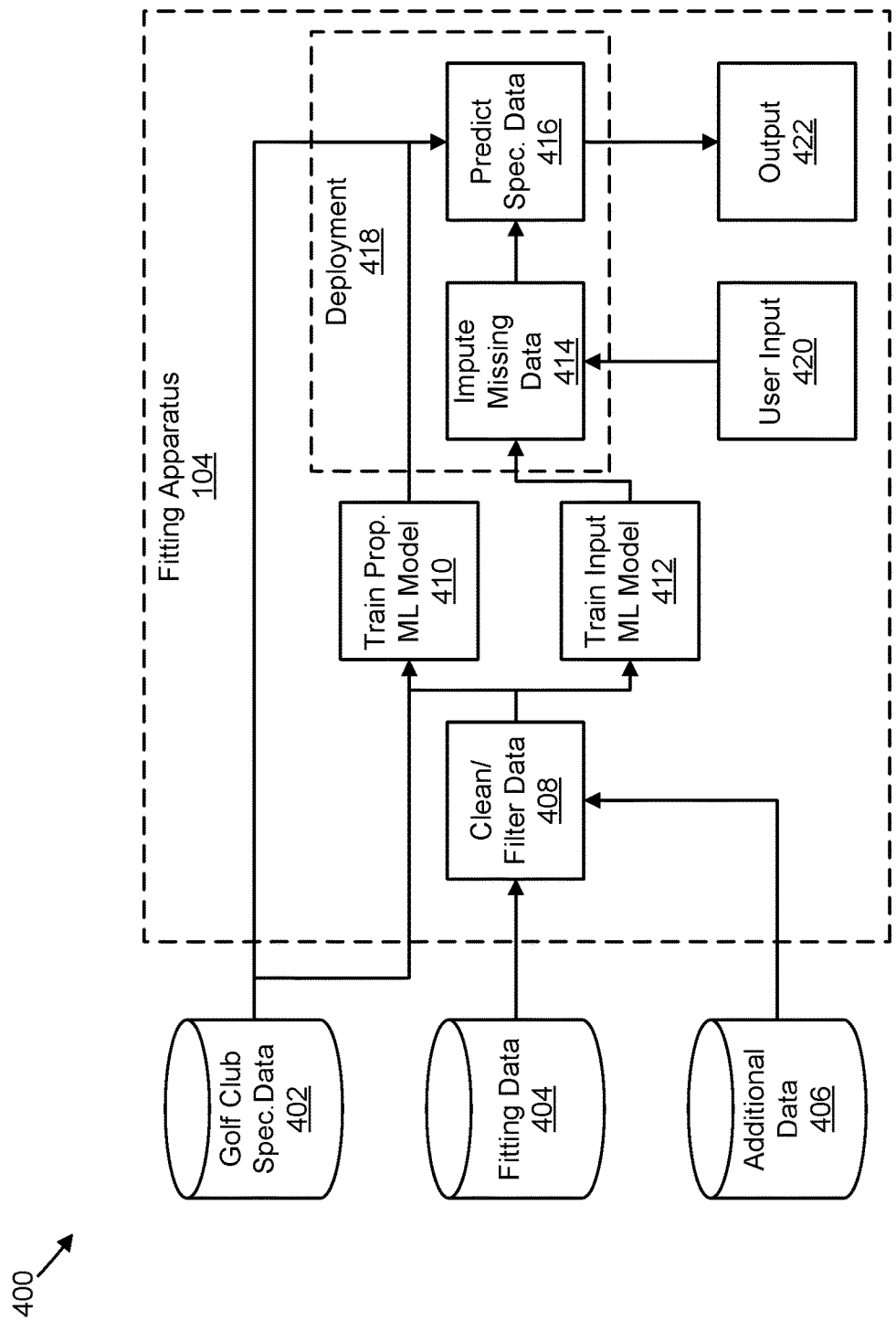
FIG. 4A is a schematic block diagram illustrating one embodiment of a system for a machine-learning-based club fitting platform.

FIG. 4A depicts one embodiment of an example system 400 for machine-learning-based golf club fitting. In one embodiment, various data sources may be used to train the system, included golf club specific data 402, which may include club properties and specifications for various golf clubs, fitting data 404, which may include golf fitting information for a plurality of different golfers, and additional data 406 such as motion tracking data, demographic data, experiential data (e.g., data captured during rounds of golf), survey data, and/or the like.

In one embodiment, the data filtering module 304 may receive or access, e.g., via an API, one or more data sources and clean 408 or filter the data to remove data outliers. In one embodiment, the model training module 302 trains 410 the property prediction machine learning module using the golf club specification data 402 and other data that has been cleaned/filtered 408. In one embodiment, the data imputation module 306 trains the input prediction machine learning model using the cleaned data to impute 414 or estimate values for parameters, variables, or the like that are missing in the existing data and in the user input data 420 that a user provides at the deployed 418 system.

In one embodiment, the full data set, including the imputed 414 values for both the historical data 402-406 and the user input 420, is provided to the trained property prediction machine learning model to predict 416 the optimal specifications for one or more golf clubs for the particular user and output 422 to the user existing golf clubs that have specifications that are a best fit for the predicted optimal specifications.

Figure 4B:
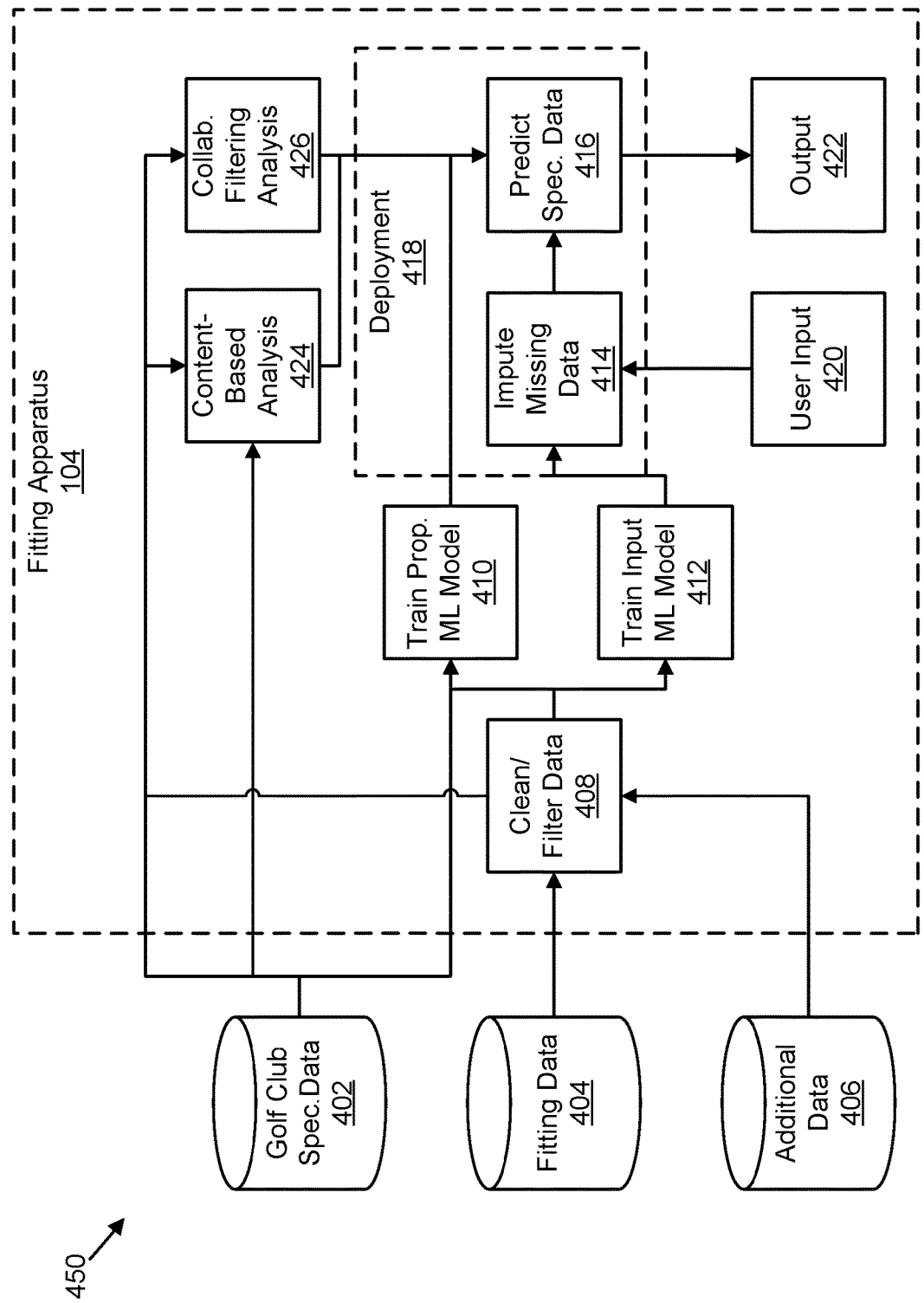
FIG. 4B is a schematic block diagram illustrating one embodiment of another system for a machine-learning-based club fitting platform.

FIG. 4B depicts one embodiment of another example system 450 for machine-learning-based golf club fitting. The system 450 depicted in FIG. 4B may be substantially similar to the system 400 depicted in FIG. 4A with the addition of the content-based analysis 424, which uses a content-based machine learning model to analyze performance data, which may be from a different source 406, and golf club property information 402 to predict a metric, e.g., strokes gained metric, for the user, based on the user's input 420. The output of the content-based analysis 424 may be used as input by the property prediction machine learning model to predict the optimal specification data 416 for the user and ultimately determine existing golf clubs that have specifications that are a best fit for the user based on the optimal specification data 416.

Further, the system 450 may perform a collaborative filtering analysis 426, using a collaborative filtering machine learning model, to utilize historical golf club purchase, preference, and/or recommendation information, for the user and for other similar golfers, to predict a set of golf clubs for the user. The output of the collaborative filtering analysis 426 may be used as input by the property prediction machine learning model to predict the optimal specification data 416 for the user and ultimately determine existing golf clubs that have specifications that are a best fit for the user based on the optimal specification data 416, e.g., within the set of golf clubs that the collaborative filtering machine learning model determines.

Figure 5:
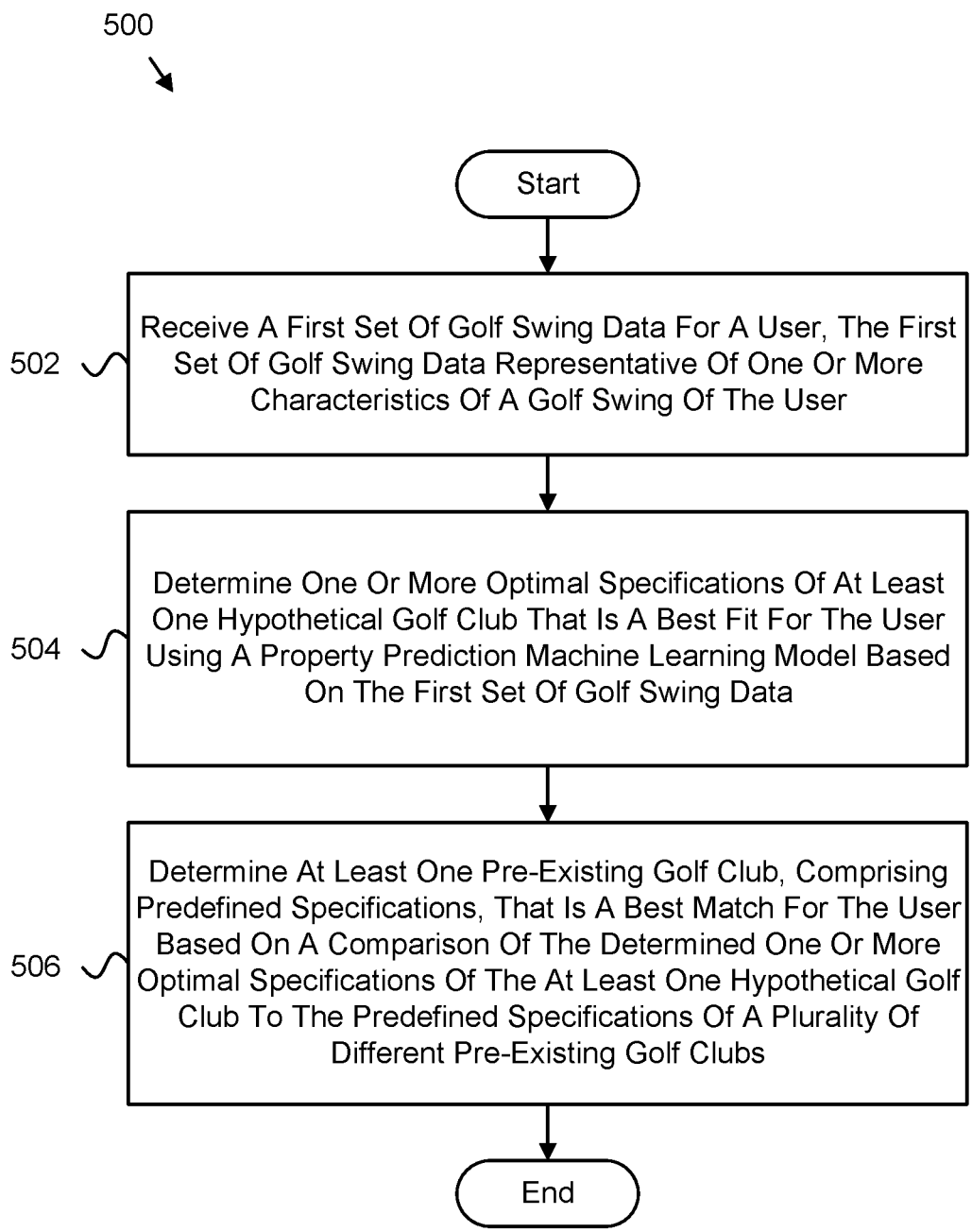
FIG. 5 is a schematic flow chart diagram illustrating one embodiment of a method for a machine-learning-based club fitting platform.

FIG. 5 depicts one embodiment of a method 500 for machine-learning-based golf club fitting. In one embodiment, the method 500 begins and receives 502 a first set of golf swing data for a user, the first set of golf swing data representative of one or more characteristics of a golf swing of the user. In one embodiment, the method 500 determines 504 one or more optimal specifications of at least one hypothetical golf club that is a best fit for the user using a property prediction machine learning model based on the first set of golf swing data. In one embodiment, the method 500 determines 506 at least one pre-existing golf club, comprising predefined specifications, that is a best match for the user based on a comparison of the determined one or more optimal specifications of the at least one hypothetical golf club to the predefined specifications of a plurality of different pre-existing golf clubs, and the method 500 ends. In one embodiment, the input receiving module 202, the specification determining module 204, and the club determining module 206 perform the steps of the method 500.

Figure 6:
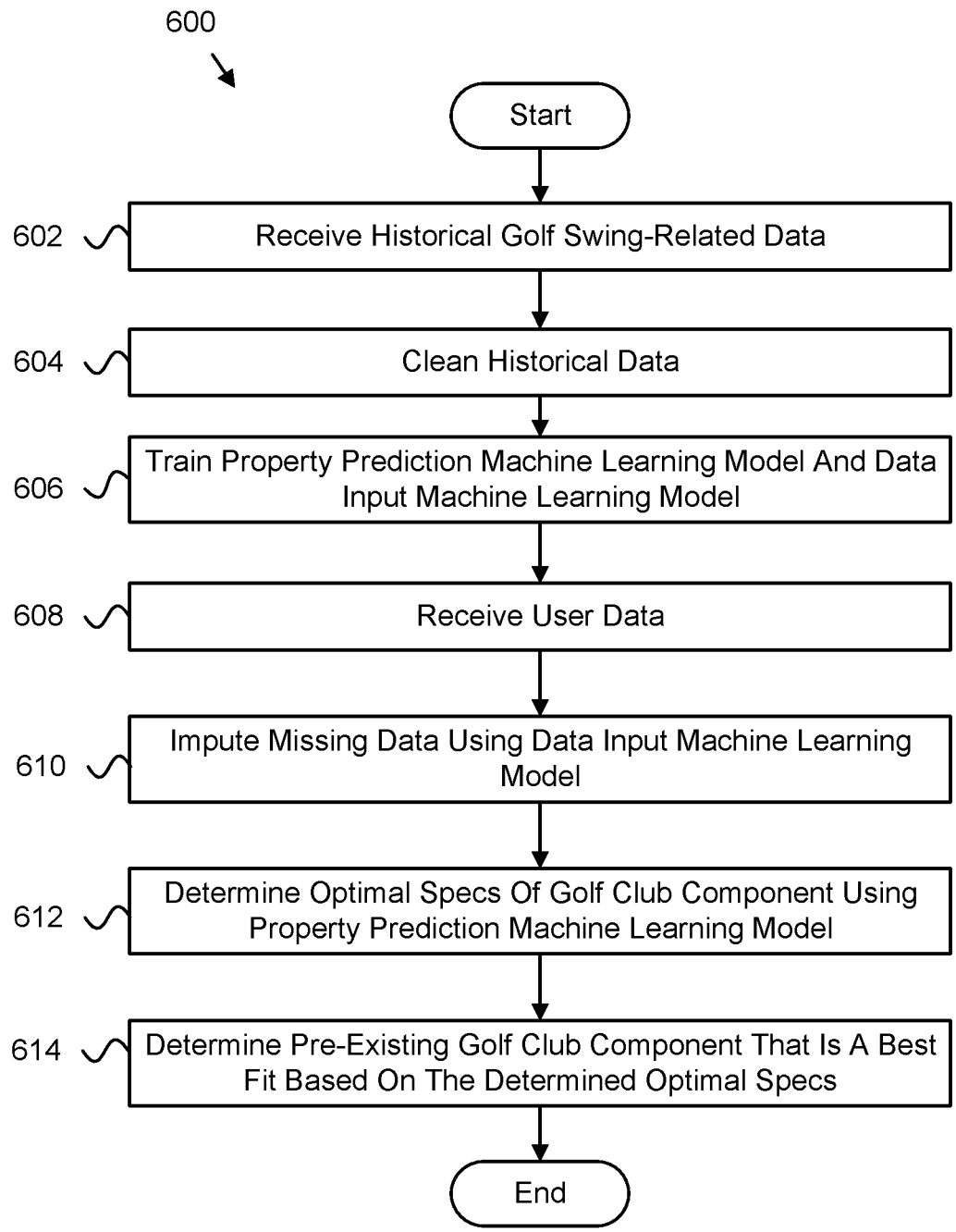
FIG. 6 is a schematic flow chart diagram illustrating one embodiment of another method for a machine-learning-based club fitting platform.

FIG. 6 depicts one embodiment of a method 600 for machine-learning-based golf club fitting. In one embodiment, the method 600 begins and receives 602 historical golf swing data for a user. In one embodiment, the method 600 cleans 604 the historical golf swing data prior to using the data for training the property prediction machine learning model by removing outlier data points from the golf swing data.

In one embodiment, the method 600 trains 606 the property prediction machine learning model and the data input machine learning model based on the received historical golf swing data. In one embodiment, the method 600 receives 608 user data and imputes 610 missing data using in the received data set (and in the historical data set) using the data input machine learning model.

In one embodiment, the method 600 determines 612 one or more optimal specifications of at least one golf club for the user using the property prediction machine learning model based on the received golf swing data. In one embodiment, the method 600 determines 614 at least one pre-existing golf club comprising predefined performance specifications that is a best fit for the user based on a comparison of the determined one or more optimal specifications of the at least one golf club for the user to predefined performance specifications of a plurality of different pre-existing golf clubs, and the method 600 ends. In one embodiment, the input receiving module 202, the specification determining module 204, the club determining module 206, the model training module 302, the data filtering module 304, and the data imputation module 306 perform the steps of the method 600.

Figure 7:
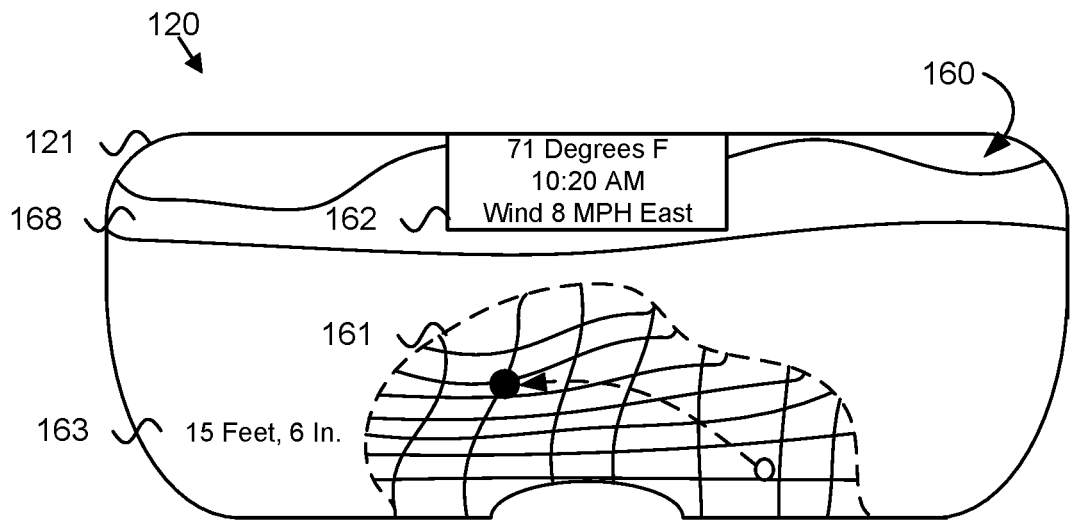
FIG. 7 is a schematic view of one embodiment of a display of augmented-reality eyewear.

FIG. 7 illustrates one example of an augmented reality eyewear 120. According to some examples, a lens 121 of the augmented-reality eyewear 120 includes a display 160 that overlays information onto real-world objects 168 viewed through the lens 121. In one particular example, as shown, the real-world objects 168 includes a putting green and the display 160 overlays course information 161, in the form of a grid, onto the putting green. In the illustrated example, the course information 161 visually indicates slope data detected by the one or more sensors on the augmented-reality eyewear 120, sensors on external devices, or predetermined data acquired from other sources. The course information 161, in the illustrated example, visually shows a user the slope of the putting green in real-time based on the angle and orientation of the putting green viewed through the lens 121, relative to the viewer. The one or more sensors of the augmented-reality eyewear 120 help determine the angle and orientation of objects relative to the viewer. For putting, the course information 161 may also include a predicted path, which accounts for the slope and identifies the line along which a ball, hit by the user, has the best chance of being made if followed. The course information 161 can include other information, such as distance-to-hole, elevation information 163, hole layout information, club recommendation information. Other information, such as environmental condition information 162 (e.g., temperature, time, and wind speed/direction), which can be sensed by the sensors on the augmented-reality eyewear 120 or acquired from other sensors external to the augmented-reality eyewear 120, can be displayed by the display 160. Yet other information displayed by the display 160 may include alignment indicia that promotes alignment of the user relative to a target (e.g., ball placement or feet placement indicia).

Figure 8:
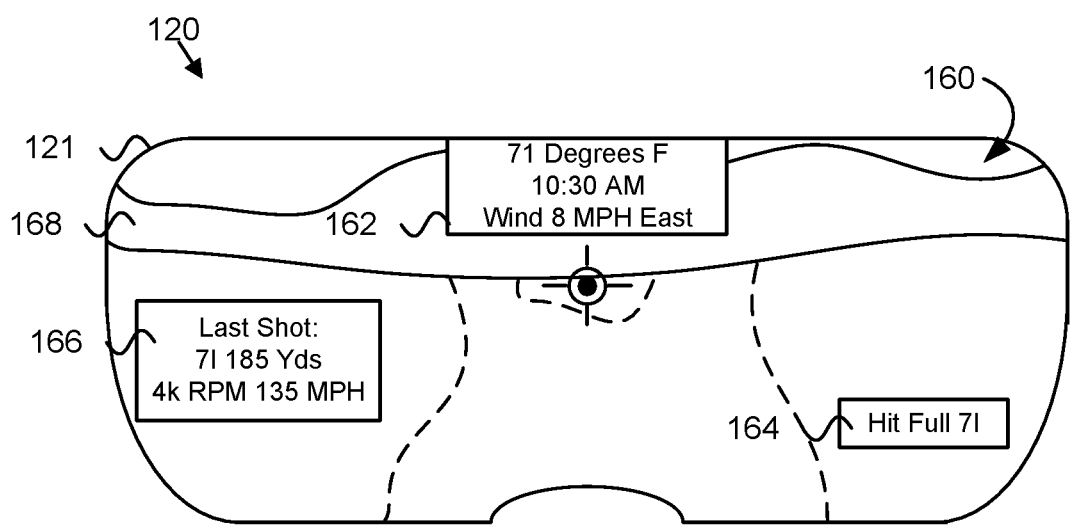
FIG. 8 is a schematic view of another embodiment of a display of augmented-reality eyewear.

FIG. 8 illustrates another example of an augmented-reality eyewear 120. As shown in FIG. 8, in some examples, the display 160 overlays command information 164 that directs a user (e.g., a golfer or fitter) through a club fitting process. In certain examples, the command information 164 includes information about what club to hit and, in some cases, how hard to hit the ball (e.g., full 7-iron versus quarter-swing 7-iron). According to various examples, the command information 164 is provided as a script that walks a golfer or a fitter through the club fitting process. The command information 164 may also include a target symbol that overlays a target at which the user should hit a golf ball. For informational purposes, the display 160 can overlay shot information 166, which includes information regarding the last shot or shots hit by the user (e.g., the club, the distance, the ball spin, the ball speed, launch conditions, and the like). In this manner, a golfer or a fitter need not look to a separate screen, such as a tablet, smart phone, or launch monitor to determine information about previous shots. Other information displayed by the display 160 can include instructional information, such as swing tips in the form of text messages, images, or videos, or entertainment information, such as interactive games and contests. In certain examples, the display 160 overlays information including golf club recommendations, determined by the apparatus disclosed herein, following a golf club fitting, such as golf club head, shaft, weight positions, grip, etc.

Outside of a club fitting session, the augmented-reality eyewear 120 can overlay information or graphics during or after a round of golf, such as a digital scorecard that is updated automatically in real-time, shot information (e.g., shot tracing) from previous rounds onto hole layouts of a current round, information about other golfer's shots on the same day and/or the same course (e.g., a digital long drive or closest to the pin marker, and associated leaderboard), a traced representation of shots taken during a round, graphics associated with the surroundings (e.g., crowds, stands, greener grounds, water features, etc.), including audible or haptic sensations (e.g., heartbeat for meaningful putts), and shot making theoretical windows through which golf shots can be struck and a graphical representation of such golf shots passing through the windows.

According to certain examples, the augmented-reality eyewear 120 includes eye sensors that detect the direction the user is looking and/or on which object the user is focused. Such a sensor facilitates the use of the user's eyes as a mouse for the purpose of, for example, selecting a target and/or ensuring the user is properly aligned relative to a target (e.g., square to a target).

Figure 9:
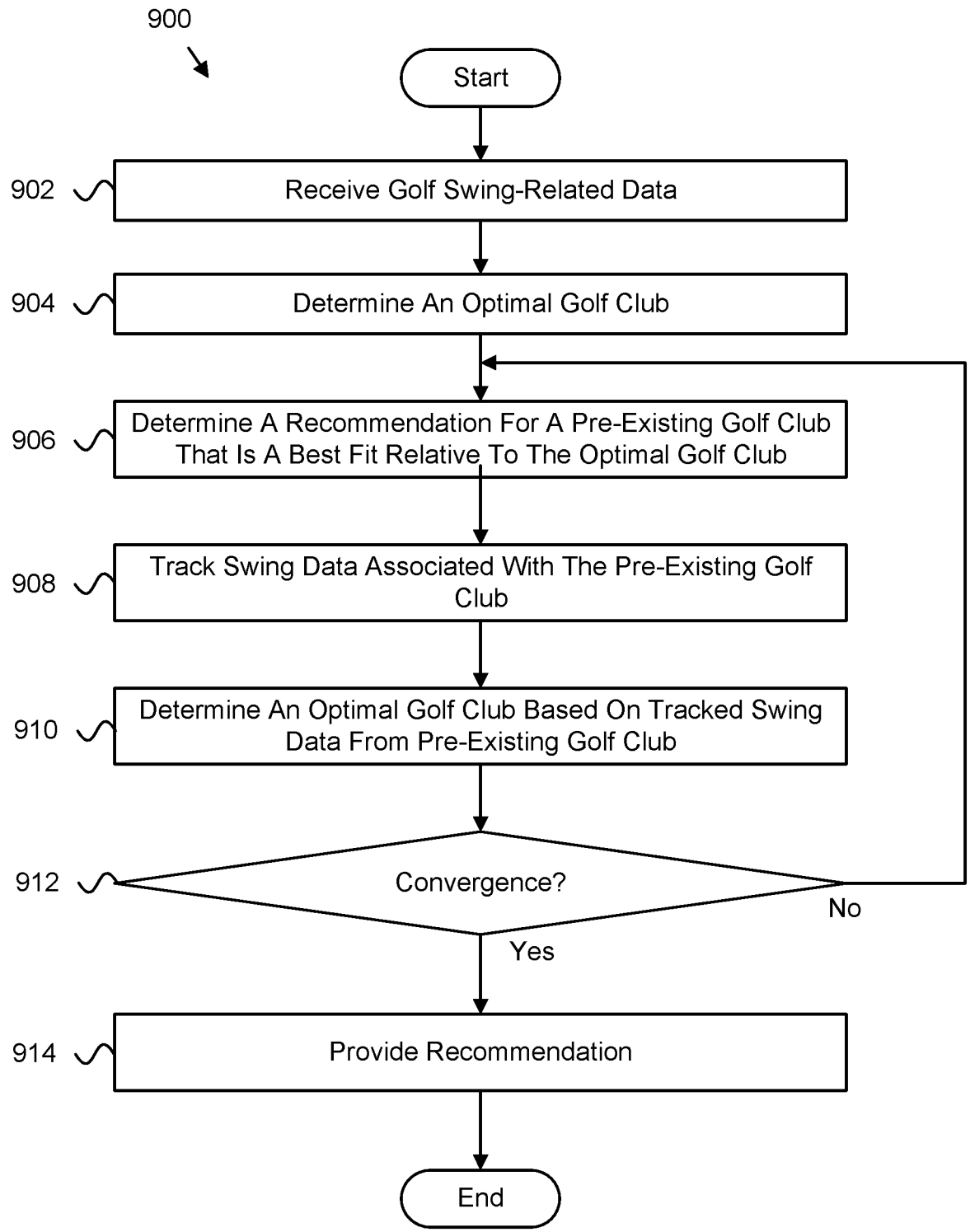
FIG. 9 is a schematic flow chart diagram illustrating one embodiment of another method for a machine-learning-based club fitting platform.

FIG. 9 depicts one embodiment of a method 900 for machine-learning-based golf club fitting. In one embodiment, the method 900 is performed by a computing device 102, a processor, a server 108, an augmented reality headset 120, a kiosk 110, a fitting apparatus 104, and/or a combination thereof.

In one embodiment, the method 900 beings and receives 902 golf swing-related data for a user, which may include subjective (e.g., survey) and objective (e.g., motion, sensed, tracked) data for the user. The method 900, in one embodiment, determines 904 an optimal golf club or golf club configuration for the user based on the received golf swing-related data.

In one embodiment, the method 900 determines 906 a recommendation for a golf club or golf club configuration that is a best fit or match for the user relative to the optimal golf club/configuration. In one embodiment, the method 900 tracks 908 swing data for the user based on a sample of golf club swings (e.g., four or more practice swings) using the recommended golf club/configuration. In one embodiment, the method 900 determines 910 a new optimal golf club/configuration based on the tracked swing data.

In one embodiment, the method 900 determines 912 whether the new optimal golf club/configuration is the same or within a threshold match of the previous optimal golf club/configuration, e.g., whether one or more parameters are substantially the same such as initial launch conditions, flight conditions (trajectory), final conditions, minimal dispersion, maximize carry distance, total distance, rollout distance (amount ball rolls after landing), attack angle, optimize peak height, descent angle, launch angle, backspin, sidespin, shot shape bias e.g. fade (slightly right for right handed golfer) or draw bias, optimize impact location which may be influenced by shaft, alignment feature on crown, top line or top line like feature or other visual alignment cue, optimize divot (e.g., bounce for irons and wedges), sole thickness, swing weight, overall club head weight, lie angle, club head length, shaft weight, grip size, grip weight, grip material and tackiness, counterbalance shaft or grip, head weight, and/or the like. If so, the method 900 provides the recommendation to the user as the optimal recommended golf club/configuration. Otherwise, the method 900 determines 906 another recommendation for a pre-existing golf club/configuration, and so on.

In various embodiments, a means for receiving golf swing data for the user, which describes one or more characteristics of a user's golf swing, may include one or more of a computing device 102, a backend server 110, a fitting apparatus 104, an input receiving module 202, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for receiving golf swing data for the user, the golf swing data describing one or more characteristics of a user's golf swing.

A means for determining one or more optimal specifications of at least one golf club for the user using a property prediction machine learning model based on the golf swing data, in various embodiments, may include one or more of a computing device 102, a backend server 110, a fitting apparatus 104, a specification determining module 204, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for determining one or more optimal specifications of at least one golf club for the user using a property prediction machine learning model based on the golf swing data.

A means for determining at least one pre-existing golf club comprising predefined performance specifications that are a best fit for the user based on a comparison of the determined one or more optimal specifications of the at least one golf club for the user to predefined performance specifications of a plurality of different pre-existing golf clubs, in various embodiments, may include one or more of a computing device 102, a backend server 110, a fitting apparatus 104, a club determining module 206, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for determining at least one pre-existing golf club comprising predefined performance specifications that are a best fit for the user based on a comparison of the determined one or more optimal specifications of the at least one golf club for the user to predefined performance specifications of a plurality of different pre-existing golf clubs.

Means for performing the other steps described herein, in various embodiments, may include one or more of a computing device 102, a backend server 110, an input receiving module 202, a specification determining module 204, a club determining module 206, a model training module 302, a data filtering module 304, a data imputation module 306, a content-based processing module 308, a collaborative filtering module 310, a fitting apparatus 104, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing one or more of the steps described herein.

Features and definitions of golf club heads and parameters can be found in U.S. Pat. Nos. 8,088,025; 9,697,613; 10,653,926; 10,888,746; 11,219,803; 11,318,358; 11,305,165; 11,731,023; 11,771,963; 9,814,944; and 8,012,039, and U.S. Patent Application Publication Nos. 2010/0292024; 2017/0229154; 2019/0232121; 2022/0118326; 2023/0256298; and 2021/0331045, which are all incorporated herein by reference in their entirety.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a processor; and
    a memory that stores code executable by the processor to:
        receive a first set of golf swing data for a user, the first set of golf swing data representative of one or more characteristics of a golf swing of the user, the first set of golf swing data comprising sensed data, survey data, or a combination thereof;
        determine one or more optimal specifications of at least one hypothetical golf club that is a best fit for the user using a property prediction machine learning model based on the first set of golf swing data, wherein the property prediction machine learning model is specially trained using a second set of golf swing data to analyze golf swing data; and
        determine at least one pre-existing golf club, comprising predefined specifications, that is a best match for the user based on a comparison of the determined one or more optimal specifications of the at least one hypothetical golf club to the predefined specifications of a plurality of different pre-existing golf clubs.

2. The apparatus of claim 1, wherein the code is executable by the processor to:
    receive the second set of golf swing data, the second set of golf swing data comprising historical golf swing data; and
    train the property prediction machine learning model based on the historical golf swing data.

3. The apparatus of claim 2, wherein the historical golf swing data comprises at least one selected from the group of fitting data, demographic data, motion capture data, test data, survey data, and experiential data.

4. The apparatus of claim 3, wherein the code is executable by the processor to clean the historical golf swing data prior to using the data for training the property prediction machine learning model by removing outlier data points from the historical golf swing data.

5. The apparatus of claim 2, wherein the code is executable by the processor to:
    identify data points that are missing within the first set of golf swing data, the historical golf swing data, or a combination thereof; and
    estimate values for the identified data points that are missing within the first set of golf swing data, the historical golf swing data, or a combination thereof.

6. The apparatus of claim 5, wherein the code is executable by the processor to provide the first set of golf swing data for the user, the historical golf swing data, or a combination thereof with the missing data points to an input prediction machine learning model for estimating values for the identified data points that are missing.

7. The apparatus of claim 1, wherein the sensed data of the first set of golf swing data for the user comprises at least one selected from the group of fitting data, motion capture data, and experiential data and the survey data comprises at least one selected from the group of demographic data, preference data, scoring data, and estimation data.

8. The apparatus of claim 1, wherein the code is executable by the processor to assign weights to various specifications of a golf club, the weights provided to the property prediction machine learning model and used to determine the one or more optimal specifications of the at least one hypothetical golf club.

9. The apparatus of claim 1, wherein the code is executable by the processor to assign weights to various parameters of the first set of golf swing data, the weights provided to the property prediction machine learning model and used to determine the one or more optimal specifications of the at least one hypothetical golf club.

10. The apparatus of claim 1, wherein the code is executable by the processor to define one or more specifications for the property prediction machine learning model that correspond to the plurality of different pre-existing golf clubs using a scaling factor for each of the one or more specifications.

11. The apparatus of claim 1, wherein the one or more optimal specifications of the at least one hypothetical golf club that the property prediction machine learning model generates are associated with a golf club head, a golf club shaft, a golf club grip, or a combination thereof, and the plurality of different pre-existing golf clubs comprise pre-existing golf club heads, golf club shafts, golf club grips, or a combination thereof.

12. The apparatus of claim 1, wherein the code is executable by the processor to further determine the one or more optimal specifications of the at least one hypothetical golf club using a content-based machine learning model that predicts a metric for one or more different golf clubs based on historical player performance data and the predefined performance specifications of a plurality of different pre-existing golf clubs.

13. The apparatus of claim 12, wherein the code is executable by the processor to determine the one or more optimal specifications of the at least one hypothetical golf club based on predicting the metric for a plurality of other golfers using the content-based machine learning model and determining which of the plurality of other golfers most closely resembles the user, the golf club specifications for the determined other golfer used to determine the one or more optimal specifications.

14. The apparatus of claim 1, wherein the code is executable by the processor to further determine the one or more optimal specifications of the at least one hypothetical golf club using a collaborative filtering machine learning model that predicts a plurality of pre-existing golf clubs for the user based on preference data of a plurality of other similar users.

15. The apparatus of claim 1, wherein the code is executable by the processor to determine one or more physics-based parameters of the property prediction machine learning module to optimize for the user.

16. The apparatus of claim 15, wherein the code is executable by the processor to update the determined one or more optimal specifications of at least one hypothetical golf club based on the determined one or more physics-based parameters to optimize for the user.

17. The apparatus of claim 1, wherein the at least one pre-existing golf club comprises a driver-type golf club, and the one or more optimal specifications of the at least one hypothetical golf club that the property prediction machine learning model generates are associated with at least one golf club head for the driver-type golf club.

18. The apparatus of claim 17, wherein the at least one golf club head is selected from a plurality of different driver-type golf club heads.

19. The apparatus of claim 18, wherein the plurality of different driver-type golf club heads comprise at least one distinct specification, the at least one distinct specification selected from the group consisting of at least one of a volume, a delta 1 value, a Zup value, a BP projection value, an Ixx inertia value, an Izz inertia value, and a center of gravity (CGx) value.

20. The apparatus of claim 19, wherein:
a first of the plurality of different driver-type golf club heads comprises a low spin/low launch specification;
a second of the plurality of different driver-type golf club heads comprises a high inertia specification; and
a third of the plurality of different driver-type golf club heads comprises a draw bias specification.

21. The apparatus of claim 19, wherein:
a first of the plurality of different driver-type golf club heads comprises a first volume ($V_1$), a first head mass ($m_1$), a first delta 1 ($d1_1$), a first Ixx ($Ixx_1$), a first Izz ($Izz_1$), a first CG projection onto a face measured relative to a standardized geometric center of the face ($CGproj1$), and a first CGx ($CGx_1$);
a second of the plurality of different driver-type golf club heads comprises a second volume ($V_2$), a second head mass ($m_2$), a second delta 1 ($d1_2$), a second Ixx ($Ixx_2$), a second Izz ($Izz_2$), a second CG projection onto a face measured relative to the standardized geometric center of the face ($CGproj_2$), and a second CGx ($CGx_2$); and
a third of the plurality of different driver-type golf club heads comprises a third volume ($V_3$), a third head mass ($m_3$), a third delta 1 ($d1_3$), a third Ixx ($Ixx_3$), a third Izz ($Izz_3$), a third CG projection onto a face measured relative to the standardized geometric center of the face ($CGproj_3$), and a third CGx ($CGx_3$).

22. The apparatus of claim 21, wherein at least one of the first volume ($V_1$), the first head mass ($m_1$), the first delta 1 ($d1_1$), the first Ixx ($Ixx_1$), the first Izz ($Izz_1$), the first CG projection onto the face measured relative to the standardized geometric center of the face ($CGproj_1$), the first CGx ($CGx_1$), is less than at least one of:
the second volume ($V_2$), the second head mass ($m_2$), the second delta 2 ($d1_2$), the second Ixx ($Ixx_2$), the second Izz ($Izz_2$), the second CG projection onto the face measured relative to the standardized geometric center of the face ($CGproj_2$), the second CGx ($CGx_2$); and
the third volume ($V_3$), the third head mass ($m_3$), the third delta 1 ($d1_3$), the third Ixx ($Ixx_3$), the third Izz ($Izz_3$), the third CG projection onto the face measured relative to the standardized geometric center of the face ($CGproj_3$), the third CGx ($CGx_3$).

\* \* \* \* \*